Nov. 29, 1960  E. PELL  2,962,646
MOTOR CONTROL SYSTEMS
Filed July 3, 1958  7 Sheets-Sheet 1

Inventor
Eric Pell
By H P Ratter
Attorney

Nov. 29, 1960 E. PELL 2,962,646
MOTOR CONTROL SYSTEMS
Filed July 3, 1958 7 Sheets-Sheet 5

Inventor
Eric Pell
By H R Rather
Attorney

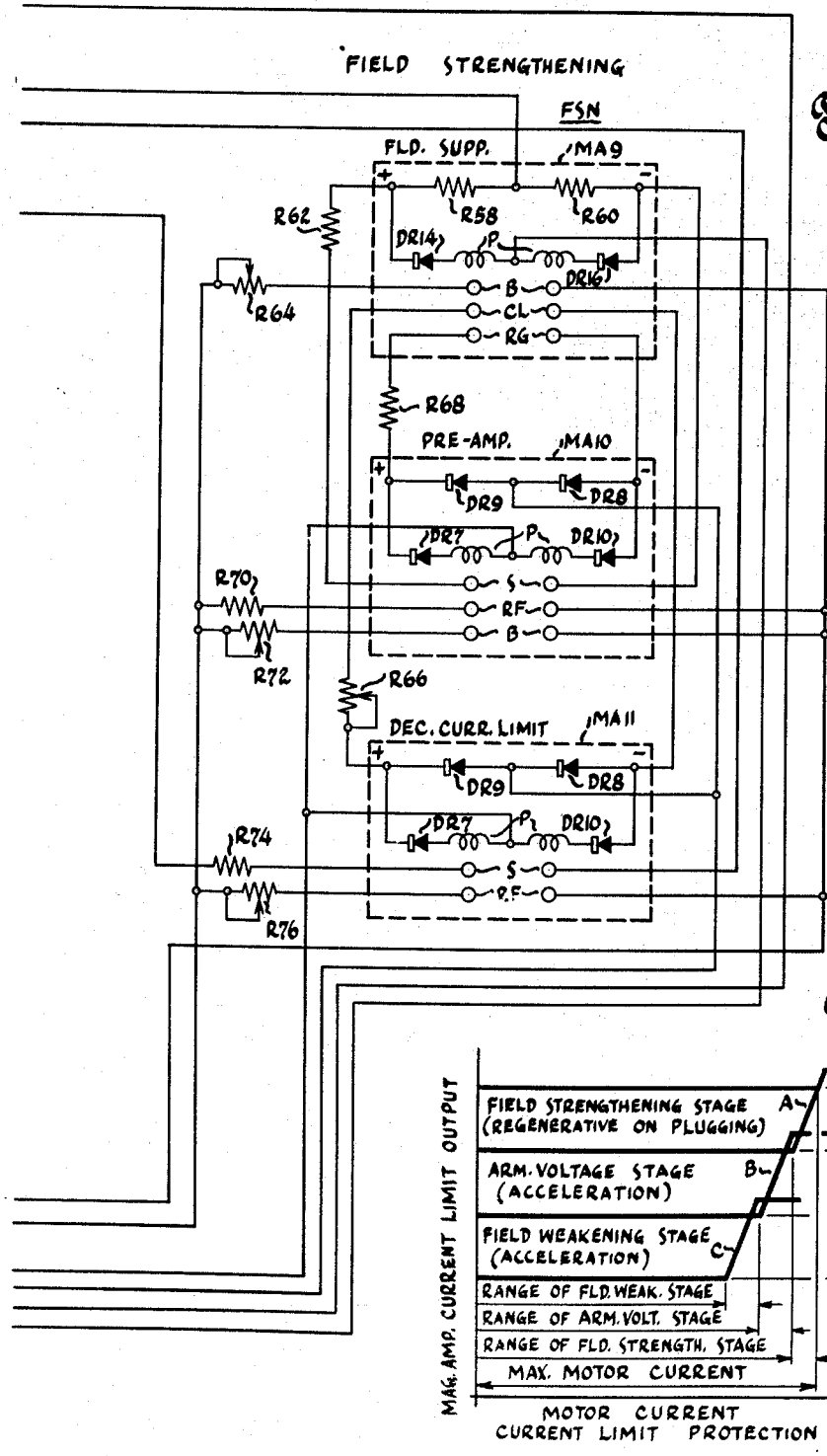

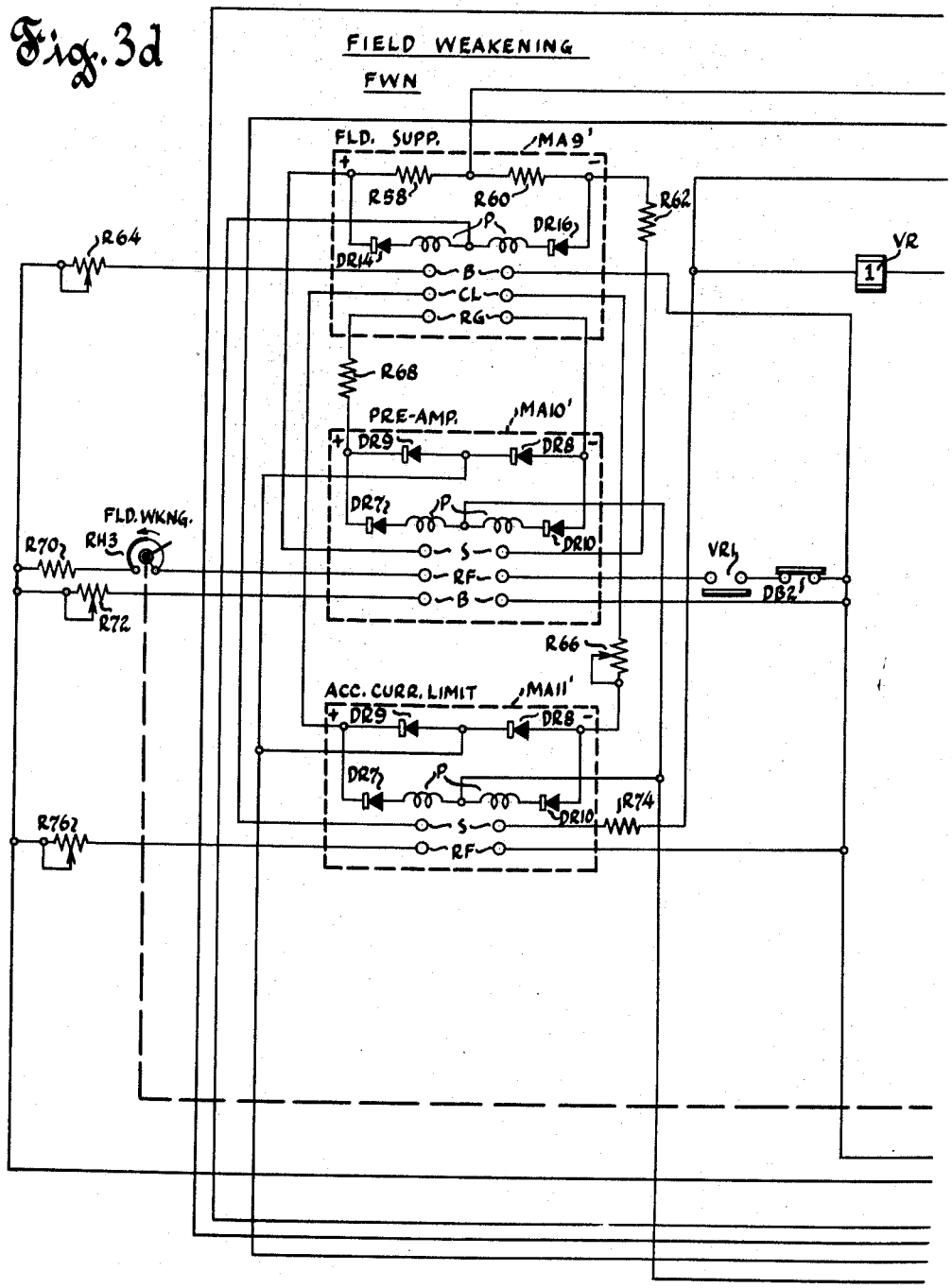

United States Patent Office 2,962,646
Patented Nov. 29, 1960

2,962,646

MOTOR CONTROL SYSTEMS

Eric Pell, Wauwatosa, Wis., assignor to Cutler-Hammer, Inc., Milwaukee, Wis., a corporation of Delaware Filed July 3, 1958, Ser. No. 746,476

21 Claims. (Cl. 318—258)

This invention relates to motor control systems and more particularly to package type, reversible field adjustable voltage systems.

A general object of the invention is to provide improved reversible, adjustable voltage motor control systems.

A more specific object of the invention is to provide systems for controlling direct current motors from an alternating current source wherein the reversing switches are connected in the alternating current circuit.

Another specific object of the invention is to provide direct current motors with improved field excitation bridge networks utilizing alternating current switches for reversing the field energization.

Another specific object of the invention is to provide such bridge networks with improved means for increasing the efficiency thereof by decreasing the amount of current bypassing the field windings.

Other objects of the invention are to provide motor control systems of the aforementioned type with package type control networks affording full field flux before armature voltage is applied, current limit acceleration and deceleration, regenerative braking during decelerating and reversing and automatic termination of such braking, IR drop compensation, and dynamic braking when stopping.

Other objects and advantages of the invention will hereinafter appear.

While the apparatus hereinafter described is effectively adapted to fulfill the objects stated, it is to be understood that I do not intend to confine my invention to the particular preferred embodiments of motor control systems disclosed, inasmuch as they are susceptible of various modifications without departing from the scope of the appended claims.

The invention will now be described with reference to the accompanying drawings wherein:

Figures 1A and 1B diagrammatically show a shunt motor control system without regulation constructed in accordance with the invention;

Figs. 3A, 3B, 3C and 3D show a circuit diagram of a shunt motor control system with regulation; and Fig. 4 graphically depicts current limit protection embodied in the system of Figs. 3A–D.

Figure 1A:
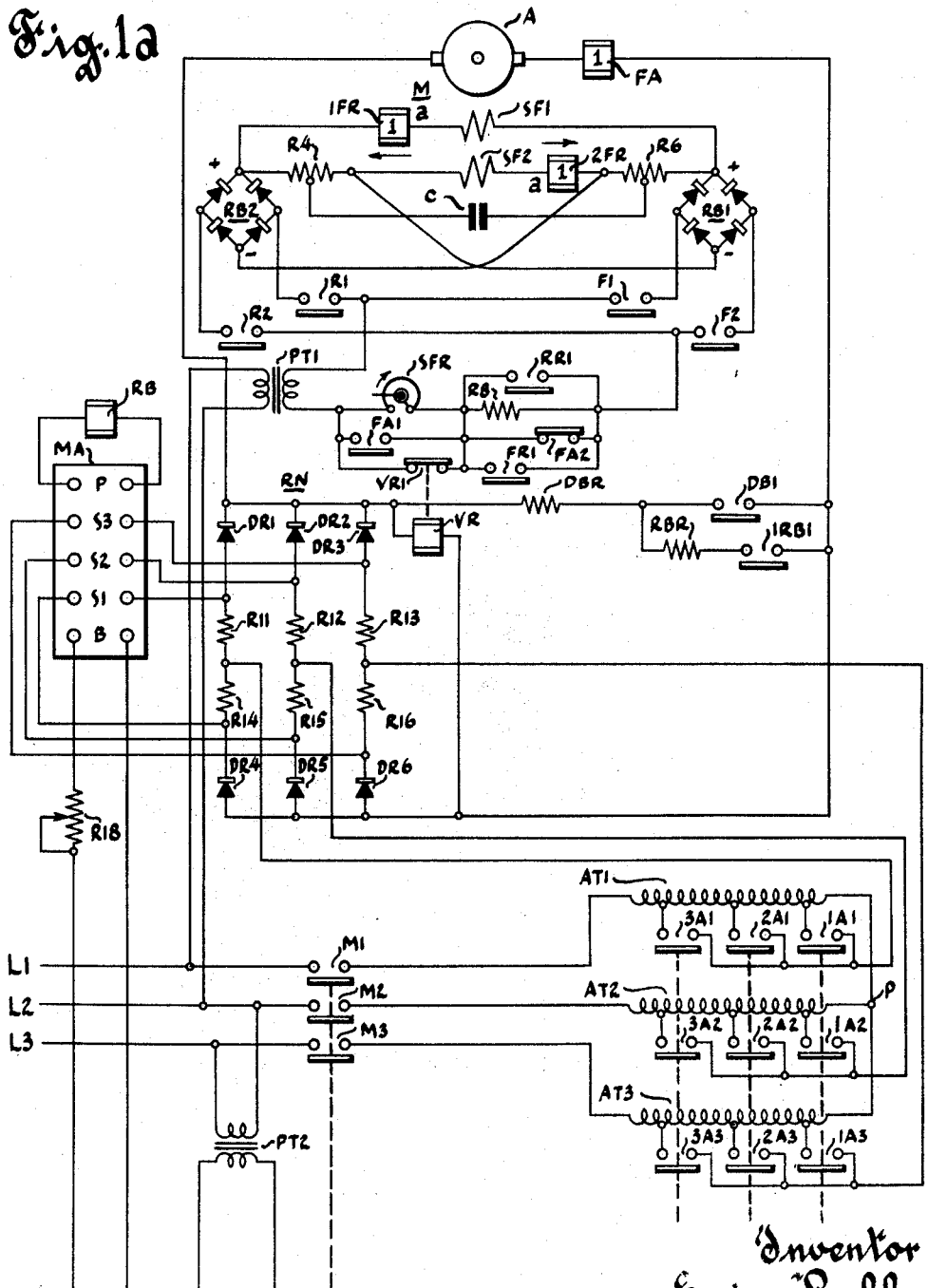

The relays and contactors in Figs. 1A–B, 2 and 3A–D have been given reference characters indicative of the functions thereof and the numeral within the operating coil indicates the total number of contacts for the corresponding device. For example, forward control relay FR in Fig. 1 has three contacts FR1, FR2 and FR3.

Figure 1B:
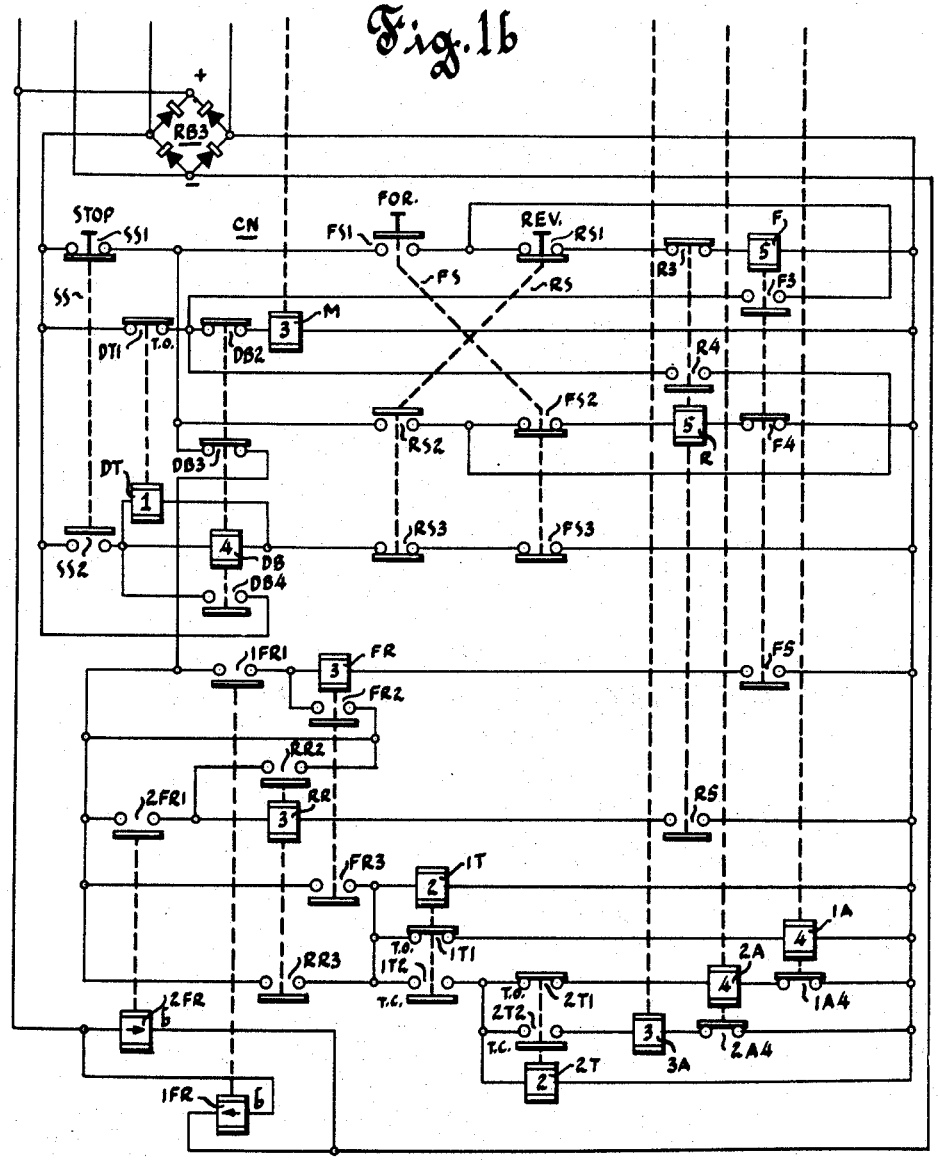

Referring to Figs. 1A–B, there is shown a direct current motor M having an armature A and a pair of shunt field windings SF1 and SF2. The shunt field windings are connected in a bridge network having a coil $a$ of relay 1FR and winding SF1 in one branch, coil $a$ of relay 2FR and winding SF2 in the opposite branch, a resistor R4 in a third branch, and in the branch opposite the latter a resistor R6. Center taps on resistors R4 and R6 are interconnected through a capacitor C for increasing field energization during the cyclic variations of the rectified alternating current. Each relay 1FR and 2FR is a polarized relay having also a coil $b$ shown at the lower portion of Fig. 1B. Relays 1FR and 2FR are adapted to close their contacts when coil $a$ is energized to aid coil $b$ as indicated by the arrows and to maintain their contacts open when coil $a$ is energized in the opposite direction or deenergized.

A rectifier bridge RB1 having its positive and negative output terminals connected to opposite terminals of the field bridge network is provided for affording forward energization of the field windings. A rectifier bridge RB2 having its positive and negative output terminals connected to the other two terminals of the field bridge network is provided for affording energization of the field windings in the reverse direction.

Both the armature and field windings of motor M are energized from lines L1, L2 and L3 which may be connected to a suitable three-phase power supply source (not shown). To this end, field power is supplied from lines L1 and L2 through transformer PT1, shunt field rheostat SFR and contacts FA2 in shunt of resistor R8 and then through normally open forward contacts F1 and F2 to bridge RB1 or through normally open reverse contacts R1 and R2 to bridge RB2. Normally closed contacts VR1 of a full voltage relay VR are connected across rheostat SFR for preventing field weakening until full armature voltage has been applied. Normally open contacts FA1 of a vibrating current limit relay FA are also connected across rheostat SFR for limiting the armature current during acceleration. Normally open contacts FR1 and RR1 of a forward control relay FR and a reverse control relay RR, respectively, are connected in parallel across resistor R8 for shunting the latter during normal forward or reverse operation of the motor. Normally closed contacts FA2 of vibrating relay FA are also connected across resistor R8 for limiting the armature current during reversing-plugging.

Voltage is supplied to the armature from lines L1–3 throught autotransformers AT1, AT2 and AT3 and a three-phase rectifier network RN. To this end, lines L1–3 are connected through normally open contacts M1, M2 and M3 and autotransformers AT1–3, respectively, to a common point P. Each autotransformer is provided with three spaced taps, the first taps thereof being connectable through normally open contacts 1A1, 1A2 and 1A3 of a first accelerating relay 1A; the second taps thereof being connectable through normally open contacts 2A1, 2A2 and 2A3 of a second accelerating relay 2A; and the third taps thereof being connectable through normally open contacts 3A1, 3A2 and 3A3 of a third accelerating relay 3A to the input terminals of rectifier network RN.

Rectifier network RN is provided with three parallel legs having pairs of rectifiers DR1 and DR4, DR2 and DR5, and DR3 and DR6 connected in series in the respective legs, with a rectifier of each pair on opposite sides of the associated input terminal. Network RN is further provided with three pairs of resistors R11 and R14, R12 and R15, and R13 and R16 connected in series in the respective legs, one resistor being in series connection between each input terminal and each rectifier. The output terminals of bridge RN are connected across armature A and the operating coil of relay FA in series. The operating coil of the aforementioned full voltage relay VR is connected across the output terminals of bridge RN. A dynamic braking resistor DBR is connectable through normally open contacts DB1 of a dynamic braking contactor DB and the operating coil of relay FA across armature A. Contacts DB1 are shunted by series connected regenerative braking resistor RBR and normally open contacts RB1 of a regenerative braking relay RB.

The operating coil of relay RB is connected for energization across the power winding output terminals P of a magnetic amplifier MA. The latter is also provided with a bias winding B for biasing the amplifier full "on" to operate regenerative braking contactor RB and signal windings S1, S2 and S3 for driving the amplifier off. Winding S1 is connected across resistors R11 and R14, winding S2 is connected across resistors R12 and R15, and winding S3 is connected across resistors R13 and R16 in network RN. Bias winding B is energized from lines L2 and L3 through a transformer PT2, a rectifier bridge RB3 and an adjustable resistor R18. The positive and negative output terminals of bridge RB3 are also connected to energize operating coils $b$ of relays 1FR and 2FR in parallel.

The secondary winding of transformer PT2 is connected across a control network CN. The latter is provided with a forward switch FS for operating a forward contactor F, a reverse switch RS for operating a reverse contactor R, and a stop switch SS. Network CN is also provided with a main contactor M for connecting power to autotransformers AT1-3, a timing relay DT for timing reversal of the motor, a dynamic braking contactor DB, a forward control relay FR, a reverse control relay RR, accelerating contactors 1A, 2A and 3A, and timing relays 1T and 2T for controlling operation of the accelerating contactors.

The operation of the shunt motor control system shown in Fig. 1 will now be described. Let it be assumed that a suitable three-phase alternating current power supply source is connected to lines L1, L2 and L3. As a result, power is supplied from lines L2 and L3 through transformer PT2 to the input terminals of rectifier bridge RB3 and from the positive and negative output terminals of the latter across operating coils $b$ of polarized relays 1FR and 2FR in parallel. Contacts 1FR1 and 2FR1 remain open until coils $a$ of these relays in the field winding circuits are energized as hereinafter described.

Power is also supplied through transformer PT2 and contacts DT1 and DB2 to energize the operating coil of main contactor M. The latter closes contacts M1, M2 and M3 to apply power to autotransformers AT1, AT2 and AT3.

Power is further supplied through transformer PT2, rectifier bridge RB3 and adjustable resistor R18 across bias winding B of magnetic amplifier MA to bias the amplifier "on." The power winding output terminals P are connected to energize regenerative braking relay RB. Magnetic amplifier MA is of a well-known type wherein decrease in energization of signal windings S1, S2 and S3 turns the amplifier "on" to energize relay RB as hereinafter described, and the details thereof have not been shown to avoid complicating the drawings.

*Running forward*

To operate the motor in the forward direction, forward switch FS is momentarily pressed to close contacts FS1 and open contacts FS2 and FS3. Contacts FS2 interrupt a point in the energizing circuit of reverse contactor R, contacts FS3 interrupt a point in the energizing circuit of dynamic braking contactor DB, and contacts FS1 complete an energizing circuit through stop switch contacts SS1, reverse switch contacts RS1 and contacts R3 for the operating coil of forward contactor F. The latter closes contacts F1 and F2 to complete an energizing circuit for shunt field winding SF1 in a circuit extending from lines L1 and L2 through transformer PT1; and then from the upper end of the secondary winding of the latter through contacts F1, a first input terminal and positive output terminal of rectifier bridge RB1, shunt field winding SF1, operating coil $a$ of relay 1FR, resistor R4, the negative output terminal and other input terminal of bridge RB1, contacts F2, FA2 and VR1 to the lower end of the secondary winding of transformer PT1; and from the lower end of the secondary winding of transformer PT1 through contacts VR1, FA2 and F2, bridge RB1 field winding SF1, operating coil $a$ of relay 1FR, resistor R4, bridge RB1 and contacts F1 to the upper end of the secondary winding. Shunt field winding SF2 is energized in parallel with shunt field winding SF1 in a circuit extending from the positive output terminal of bridge RB1 through resistor R6, operating coil $a$ of relay 2FR and winding SF2 to the negative output terminal of bridge RB1.

Forward contactor F also closes contacts F3 to complete a self-maintaining circuit for its operating coil through contacts R3, RS1 and DT1, the latter contacts being in shunt of contacts SS1 and FS1 so that the forward switch may be released. Contactor F further opens interlocking contacts F4 to prevent concurrent energization of reverse contactor R, and closes contacts F5 to partially complete an energizing circuit for the operating coil of forward control relay FR.

When shunt field winding SF1 is fully energized, operating coil $a$ of polarized relay 1FR energizes to aid the magnetic force of its coil $b$ and contacts 1FR1 close to complete an energizing circuit for the operating coil of relay FR. This circuit may be traced through contacts SS1, DB3 and 1FR1, the operating coil of relay FR and contacts F5. Relay FR closes contacts FR2 to complete a self-maintaining circuit in shunt of contacts 1FR1 and closes contacts FR1 to shunt resistor R8 effectively out of the field winding circuit; contacts FA2 opening during motor acceleration as hereinafter described. Relay FR also closes contacts FR3 to energize the operating coil of timing relay 1T through contacts SS1 and DB3, and to energize the operating coil of first step accelerating contactor 1A in parallel therewith through contacts 1T1.

Contactor 1A closes contacts 1A1, 1A2 and 1A3 to apply power from autotransformers AT1, AT2 and AT3 to the armature winding A of the motor. More specifically, a first phase circuit extends from line L1 through contacts M1, autotransformers AT1, contacts 1A1, resistor R11, rectifier DR1, armature A, operating coil of relay FA, rectifier DR6, resistor R16, contacts 1A3, autotransformer AT3 and contacts M3 to line L3. A second phase circuit extends from line L2 through contacts M2, autotransformer AT2, contacts 1A2, resistor R12, rectifier DR2, armature A, operating coil of relay FA, rectifier DR4, resistor R14, contacts 1A1, autotransformer AT1 and contacts M1 to line L1. A third phase circuit extends from line L3 through contacts M3, autotransformer AT3, contacts 1A3, resistor R13, rectifier DR3, armature A, operating coil of relay FA, rectifier DR5, resistor R15, contacts 1A2, autotransformer AT2 and contacts M2 to line L2. Contactor 1A also opens contacts 1A4 to prevent energization of second step accelerating contactor 2A until contactor 1A is again effectively deenergized.

In response to the load current flowing through network RN, signal winding S1 is energized across resistors R11 and R14, signal winding S2 is energized across resistors R12 and R15 and signal winding S3 is energized across resistors R13 and R16 to bias amplifier MA a predetermined amount beyond cut-off. As a result, the operating coil of relay RB is deenergized to open contacts RB1.

Armature A and shunt field windings SF1 and SF2 being thus energized, the motor starts in the forward direction and accelerates to a first speed point.

After a predetermined time interval, contacts 1T1 open and contacts 1T2 close. Contacts 1T1 interrupt energization of contactor 1A and contacts 1T2 partially complete an energizing circuit for contactor 2A which is completed on closure of contacts 1A4 and completes an energizing circuit for timing relay 2T. These circuits may be traced from transformer PT2 through contacts SS1, DB3, FR3, and 1T2 and the operating coil of relay 2T and in parallel with the latter through contacts 2T1, the operating coil of contactor 2A and contacts 1A4. Contactor 2A closes contacts 2A1, 2A2 and 2A3 to apply a higher voltage from the autotransformers to armature A. As a result, the motor accelerates to a second speed point.

After another predetermined time interval, contacts 2T1 open to interrupt energization of contactor 2A and contacts 2T2 partially complete an energizing circuit for the operating coil of contactor 3A which is completed on closure of contacts 2A4. Contactor 3A closes contacts 3A1, 3A2 and 3A3 to apply full voltage from the three-phase autotransformer to the motor armature. As a result, the motor accelerates to a third and last speed point.

When full voltage is applied to the armature, the operating coil of relay VR is energized in parallel with the armature and opens contacts VR1 to interrupt the shunt across field rheostat SFR. As will be apparent, relay VR maintains contacts VR1 closed to prevent field weakening until full voltage has been applied to the armature.

Further acceleration of the motor is attained by operating rheostat SFR in the direction of the arrow to weaken the shunt fields. As a result, coil $a$ of relay 1FR may deenergize sufficiently to permit opening of contacts 1FR1; however, relay FR is maintained energized through contacts FR2.

Current limiting during acceleration by field weakening is provided by relay FA. When the movable arm of field weakening rheostat SFR is suddenly turned in the clockwise direction to increase the resistance and thus to weaken the shunt field, the armature current increases. As a result, the operating coil of relay FA energizes in series with the armature to limit the armature current. To this end, relay FA closes contacts FA1 to shunt the field rheostat SFR effectively out of the circuit and thereby to strengthen the field. The resultant increase in field energization limits the armature current to a safe value. Relay FA also opens contacts FA2 without effect because contacts FR1 in shunt thereof are closed. When the armature current decreases, the energization of relay FA is decreased, opening contacts FA1 to weaken the field and afford further acceleration and increase in armature current. This causes relay FA to reclose and again shunt the field rheostat. Thus, the contacts of relay FA vibrate until the motor has accelerated sufficiently at limited current so that the opening of contacts FA1 does not produce high enough armature current to energize the relay coil.

The motor now runs in the forward direction at a speed determined by the setting of shunt field rheostat SFR. Contactors M, F and 3A and relays VR, FR, 1FR, 1T and 2T remain energized.

Regenerative braking

To decrease the speed of the motor, rheostat SFR is turned in the counterclockwise direction to decrease its resistance and to strengthen the shunt field. As a result, the counter E.M.F. of the armature increases to decrease the load current. The resultant decrease in energization of signal windings S1, S2 and S3 of magnetic amplifier MA drives the latter "on" to energize regenerative braking relay RB. Contacts RB1 close to complete a regenerative braking circuit from the left-hand side of armature A through resistors DBR and RBR, contacts RB1 and the operating coil of relay FA to the right-hand side of armature A. Thus, regenerative braking is applied to the motor to decrease its speed.

It will be apparent that when the motor speed has decreased to a constant value, the load current increases to reenergize signal windings S1, S2 and S3 to bias amplifier MA off and deenergize relay RB to terminate regenerative braking.

Stopping with dynamic braking

To stop the motor, stop switch SS is pressed to open contacts SS1 and to close contacts SS2. Contacts SS1 interrupt energization of contactor 3A and relays FR, 1T and 2T. Contacts 3A1, 3A2 and 3A3 disconnect power from rectifier network RN and, consequently, from the motor armature. Relay VR deenergizes and closes contacts VR1 to shunt the field rheostat effectively out of the circuit to strengthen the shunt field energization. Contacts SS2 complete an energizing circuit for the parallel connected operating coils of timing relay DT and dynamic braking relay DB through contacts RS3 and FS3. It will be apparent that the latter contacts prevent dynamic braking of the motor if either the forward switch or the reverse switch is pressed.

Relay DB closes contacts DB1 to complete a dynamic braking loop circuit extending from the left-hand side of armature A through dynamic braking resistor DBR, contacts DB1 and the operating coil of relay FA to the right-hand side of armature A. As a result, dynamic braking is applied to the motor for a predetermined time interval depending upon the setting of timing relay DT. Contacts DT1 of relay DT may be set to open when the motor approaches zero speed.

Contactor DB also opens contacts DB2 to interrupt energization of main contactor M thereby to disconnect power from the autotransformers, opens contacts DB3 to further interrupt the circuit of contactor 3A and relays FR, 1T and 2T, and closes contacts DB4 to complete a self-maintaining circuit in shunt of contacts SS2 so that the stop switch may be released.

After the aforementioned time interval, timed opening contacts DT1 open to interrupt energization of forward contactor F. The latter opens contacts F1 and F2 to disconnect power from the shunt field windings. Under these conditions, the motor has stopped and contactor DB remains energized until a forward or reverse switch is again pressed or the power supply switch (not shown) is opened.

Reversing plugging

Let it be assumed that the motor is operating in the forward direction as hereinbefore described and reverse switch RS is pressed to open contacts RS1 and RS3 and to close contacts RS2. Contacts RS1 interrupt energization of forward contactor F. The latter opens contacts F1 and F2 to disconnect power from the field windings, opens contacts F3 to interrupt its self-maintaining circuit, closes contacts F4 to complete an energizing circuit for the operating coil of reverse contactor R, and opens contacts F5 to interrupt energization of relay FR. The circuit of contactor R may be traced through contacts SS1, RS2, FS2 and F4.

Relay FR opens contacts FR1 to interrupt the shunt across resistor R8, opens contacts FR2 to interrupt its self-maintaining circuit, and opens contacts FR3 to interrupt energization of relays 1T and 2T and contactor 3A. The latter opens contacts 3A1, 3A2 and 3A3 to disconnect power from armature A and to deenergize relay VR and to energize relay RB.

Reverse contactor R closes contacts R1 and R2 to energize field windings SF1 and SF2 in the reverse direction. This circuit may be traced from the upper end of the secondary winding of transformer PT1 through contacts R1, rectifier bridge RB2, operating coil $a$ of relay 1FR, winding SF1, resistor R6, bridge RB2, and contacts R2, FA2 and VR1 to the lower end of the secondary winding. The circuit of each alternate half-cycle extends from the lower end of the secondary winding of transformer PT1 through contacts VR1, FA2 and R2, bridge RB2, coil $a$ of relay 1FR, winding SF1, resistor R6, bridge RB2 and contacts R1 to the upper end of the secondary winding. Winding SF2 is energized in the reverse direction in parallel with winding SF1 across the positive and negative output terminals of bridge RB2 through resistor R4, winding SF2 and operating coil $a$ of relay 2FR.

The reversal of the field energization reverses the counter E.M.F. of the armature while the motor is still rotating in the forward direction. As a result, a high current flows from the right-hand side of armature A through the operating coil of relay FA, and bridge circuit RN in parallel with contacts RB1 and regenerative braking resistor RBR and dynamic braking resistor DBR to the left-hand side of armature A to regeneratively brake the motor. Relay FA energizes and opens contacts FA1 to insert resistor R8 effectively in the field winding circuit. Thus, the field is weakened or regulated to some predetermined value of armature current.

When the motor approaches zero speed, relay FA deenergizes to close contacts FA1 and strengthen the field energization. As a result, operating coil $a$ of relay 2FR energizes to aid the magnetic force of its coil $b$ and contacts 2FR1 close to effect energization of relay RR. The latter closes contacts RR1 to complete another shunt across resistor R8, closes contacts RR2 to complete a self-maintaining circuit in shunt of contacts 2FR1, and closes contacts RR3 to effect energization of timing relay 1T and contactor 1A. The latter closes contacts 1A1, 1A2 and 1A3 to reapply power to armature A and effect rotation thereof in the reverse direction. The load current biases amplifier MA off to deenergize relay RB. Timing relay 1T then operates as hereinbefore described to operate contactor 2A and timing relay 2T and the latter operates contactor 3A to apply full voltage to the armature.

As a result, relay VR energizes and opens contacts VR1 to interrupt the shunt across field rheostat SFR to afford further increase in motor speed by field weakening.

Figure 2:
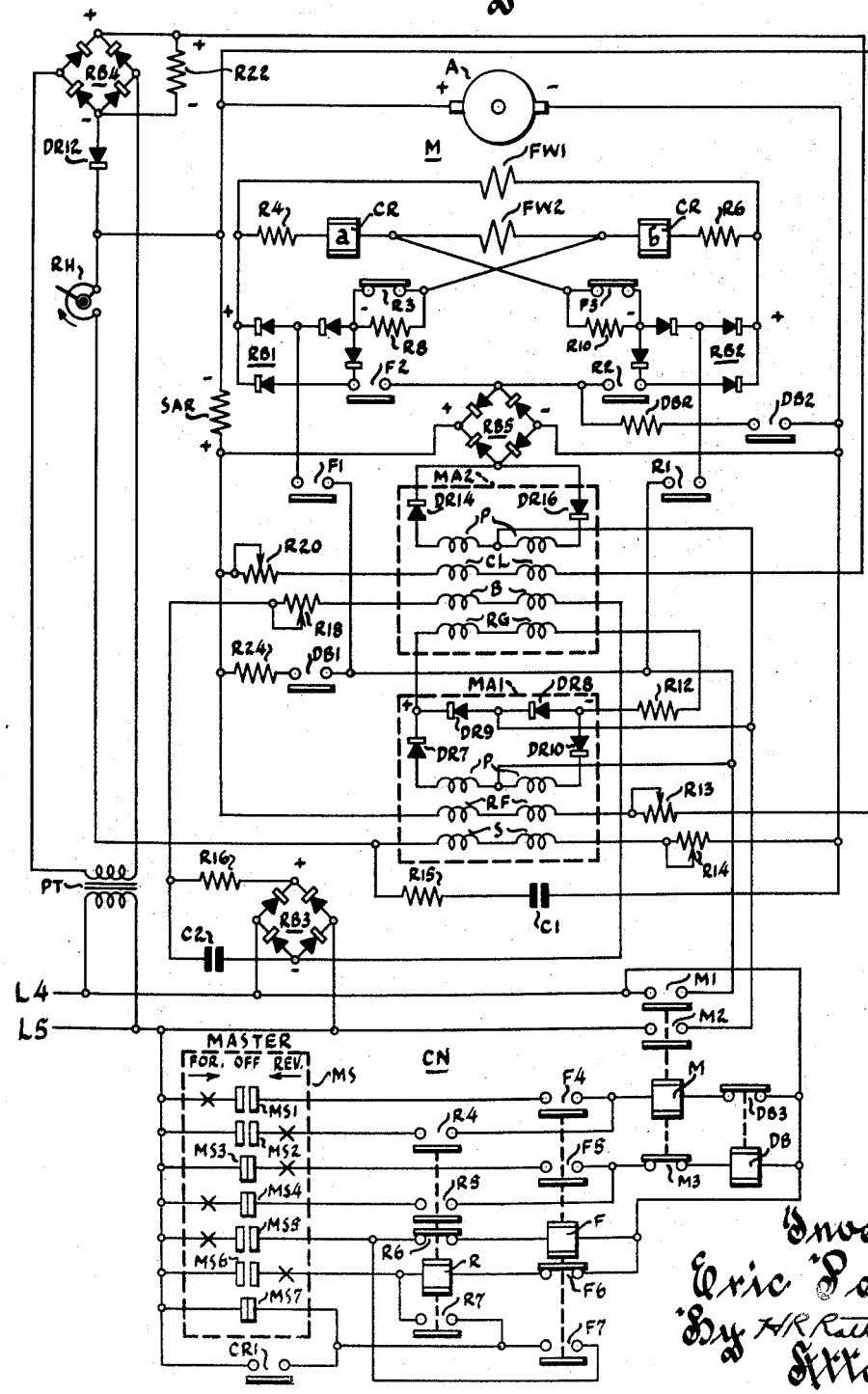
Fig. 2 is a circuit diagram of a series motor control system in accordance with the invention.

Referring to Fig. 2, there is shown a direct current motor M having an armature A and series field windings FW1 and FW2. Each winding FW1 and FW2 is provided with the same number of turns employed in a motor having a single field winding because one-half the armature current flows through each winding. Windings FW1 and FW2 are connected in the opposite branches of a field bridge network, a third branch thereof having resistor R4 and operating coil $a$ of relay CR connected in series, and the fourth branch opposite the third branch having resistor R6 and operating coil $b$ of relay CR connected in series. Opposite terminals of the field bridge network are connected to the positive output terminal of a rectifier bridge RB1 and through parallel connected resistor R8 and normally closed contacts R3 of a reverse contactor R to the negative output terminal of bridge RB1 for forward energization of the field windings. The other opposite terminals of the field bridge network are connected to the positive output terminal of a rectifier bridge RB2 and through parallel connected resistor R10 and normally closed contacts F3 of a forward contactor F to the negative output terminal of bridge RB2 for reverse energization of the field windings.

A preamplifier MA1 and a power amplifier MA2 of the magnetic type are provided for supplying and controlling power from power supply lines L4 and L5 to the armature and series field windings of motor M. To this end, preamplifier MA1 is provided with power windings P, reference windings RF and signal windings S. Lines L4 and L5 are connectable through normally open contacts M1 and M2 to the input terminals of preamplifier MA while the positive and negative output terminals of the preamplifier are connected through a resistor R12 across regulating windings RG of power amplifier MA2. Preamplifier MA1 is provided with the usual rectifier bridge comprising a rectifier DR7 connecting the left-hand power winding P to the positive output terminal, a rectifier DR8 connecting the negative output terminal to the upper input terminal, a rectifier DR9 connecting the upper input terminal to the positive output terminal, and a rectifier DR10 connecting the negative output terminal to the right-hand power winding P, the lower input terminal being at the junction of the power windings. Reference windings RF are connected in series with an adjustable resistor R13 across a series armature resistor SAR and signal windings S are connected through a speed setting rheostat RH and an adjustable resistor R14 across armature A. A filter network comprising a series connected resistor R15 and a capacitor C1 is connected across rheostat RH and armature A.

Power amplifier MA2 is provided with power windings P, current limit windings CL, bias windings B and the aforementioned regulating windings RG. Lines L4 and L5 are connected through a rectifier bridge RB3, a resistor R16 and an adjustable resistor R18 to bias windings B. A filter capacitor C2 is connected across resistor R18 and bias windings B. Current limit windings CL are connected through an adjustable resistor R20, a spillover bias resistor R22 and a rectifier DR12 across series armature resistor SAR. Spillover bias voltage for current limiting is provided from lines L4 and L5 through transformer PT and a rectifier bridge RB4 across resistor R22 of a polarity opposite to the normal voltage drop across resistor SAR.

Line L4 is connectable through contacts M1 and then through normally open contacts F1 to the upper input terminal of forward rectifier bridge RB1 and through normally open contacts R1 to the upper input terminal of reverse rectifier bridge RB2. Line L5 is connectable through contacts M2, the left-hand power winding P of power amplifier MA2 and rectifier DR14 to the lower input terminal of a rectifier bridge RB5 while a reverse path extends from the lower input terminal of bridge RB5 through a rectifier DR16, the right-hand power winding P of amplifier MA2 and contacts M2 to line L5. The upper input terminal of bridge RB5 is connectable through normally open contacts F2 to the lower input terminal of forward bridge RB1 and through normally open contacts R2 to the lower input terminal of reverse bridge RB2. The positive output terminal of bridge RB5 is connected through resistor SAR and armature A to the negative output terminal of bridge RB5. A dynamic braking circuit extends from the left-hand side of armature A through resistors SAR and R24, normally open contacts DB1 and F1, bridge RB1, field winding FW1, resistor R6, coil $b$ of relay CR, contacts R3, bridge RB1, contacts F2, dynamic braking resistor DBR and contacts DB2 to the right-hand side of armature A. In the dynamic braking loop circuit, field winding FW2 is connected in parallel with field winding FW1 across the output terminals of bridge RB1 through resistor R4, coil $a$ of relay CR, winding FW2 and contacts R3.

A control network CN is connected across lines L4 and L5 for controlling motor M. Network CN comprises a master switch MS of the manual drum type or the like having forward, off and reverse operation positions, a main contactor M for connecting lines L4 and L5 to power amplifier MA2, a forward contactor F for forward running of the motor, a reverse contactor R for reverse running of the motor, and a dynamic braking contactor DB. Contactors M and DB are mechanically as well as electrically interconnected to prevent braking the motor while power is connected thereto.

The operation of the system shown in Fig. 2 will now be described. Let it be assumed that a suitable alternating current power supply source is connected to lines L4 and L5. As a result, power is applied from lines L4 and L5 across the input terminals of rectifier bridge RB3 and from the positive and negative output terminals of the latter across bias winding B of power amplifier MA2 to bias the latter to cut-off. This circuit may be traced from the positive terminal of bridge RB3 through resistor R16, adjustable resistor R18, bias winding B of power amplifier MA2 to the negative terminal of bridge RB3.

To start the motor in the forward direction, master switch MS is turned in the direction of the light-hand directed arrow to its forward operating position to close contacts MS1 and MS5, to maintain contacts MS4 closed and to open contacts MS3 and MS7. Contacts MS1 partially complete an energizing circuit for main contactor M. Contacts MS3 prevent energization of dynamic braking contactor DB. Contacts MS4 perform no useful function at this time. Contacts MS7 interrupt the shunt across contacts CR1 and contacts MS5 complete an energizing circuit for forward contactor F through contacts R6 across lines L4 and L5. Contactor F closes contacts F1 and F2 to partially complete an energizing circuit for the armature and series field windings of the motor, and opens contacts F3 to insert high resistor R in parallel with field winding F2. Contactor F also closes contacts F4 to complete the energizing circuit of main contactor M through contacts MS1 and DB3, closes contacts F5 to partially complete an energizing circuit for dynamic braking contactor DB, opens interlocking contacts F6 to prevent concurrent energization of reverse contactor R, and closes contacts F7 to partially complete a self-maintaining circuit for contactor F.

Main contactor M being thus energized, closes contacts M1 and M2 to connect power supply lines L4 and L5 to magnetic amplifiers MA1 and MA2. The power supply circuit to magnetic amplifier MA1 may be traced from line L4 through contacts M1, the left-hand power winding P of amplifier MA1, rectifier DR7, regulating winding RG of amplifier MA2, resistor R12, rectifier DR8 and contacts M2 to line L5; and from line L5 through contacts M2, rectifier DR9, regulating winding RG, resistor R12, rectifier DR10, the right-hand power winding P of amplifier MA1 and contacts M1 to line L4. The power supply circuit to magnetic amplifier MA2 may be traced from line L4 through contacts M1 and F1 and rectifier bridge RB1 where it divides; one branch extending through field winding FW1, resistor R6 and coil $b$ of relay CR; and the other branch extending through resistor R4, coil $a$ of relay CR, and field winding FW2; and then through contacts R3, rectifier bridge RB1, contacts F2, rectifier bridge RB5, resistor SAR, armature A, rectifier bridge RB5, rectifier DR16, the right-hand power winding P of amplifier MA2 and contacts M2 to line L5. The power supply circuit for amplifier MA2 for each alternate half-cycle extends from line L5 through contacts M2, the left-hand power winding P of amplifier MA2, rectifier DR14, bridge RB5, resistor SAR, armature A, bridge RB5, contacts F2 and rectifier bridge RB1 where it divides, one branch extending through field winding FW1, resistor R6, and coil $b$ of relay CR and the other branch extending through resistor R4, coil $a$ of relay CR and field winding FW2, and then through contacts R3, bridge RB1 and contacts F1 and M1 to line L4. However, power amplifier MA2 does not permit current flow to the armature and field windings until it is driven to an "on" condition as hereinafter described.

Power is also supplied from lines L4 and L5 through transformer PT across the input terminals of rectifier bridge RB4 and from the positive and negative output terminals of the latter across resistor R22 to provide a bias voltage for spillover current limiting as hereinafter described.

The power supplied from lines L4 and L5 to preamplifier MA1 drives the latter approximately half "on." The resultant output from preamplifier MA1 is applied through resistor R12 to regulating winding RG of power amplifier MA2 to drive the letter to an "on" condition. As a result, current flows in series through the field and armature windings of the motor in the circuit hereinbefore described to start the motor rotating in the forward direction.

Since this is a series motor and the field energization varies with the load, the speed is determined by matching a reference voltage proportional to load current against a signal voltage proportional to armature voltage. To this end, a reference voltage proportional to armature current is fed back from the lower, positive end of series armature resistor SAR through reference winding RF and resistor R13 to the upper, negative end of resistor SAR. A signal voltage proportional to armature voltage is fed back from the left-hand side of armature A through speed setting rheostat RH, signal winding S and resistor R14 to the right-hand side of armature A. Energization of reference winding RF drives the preamplifier toward its "on" condition and energization of signal winding S drives the preamplifier toward its "off" condition. Therefore, the speed of the motor may be adjusted by operating speed setting rheostat RH to adjust the energization of signal winding S. Operation of rheostat RH in the direction of the clockwise arrow decreases the energization of signal winding S to increase the output of preamplifier MA1 and, consequently, to increase the motor speed. Conversely, operation of rheostat RH in the counterclockwise direction increases the energization of signal winding S to decrease the output of preamplifier MA1. As a result, the motor speed is decreased. A network comprising series connected resistor R15 and capacitor C1 is connected across rheostat RH and armature A to filter the voltage fed back from the armature to signal winding S.

When rheostat RH is operated in the clockwise direction to increase the armature voltage, the motor draws a high current from the power supply lines. Normally the spillover bias voltage drop across resistor R22 is more or equal to the voltage drop across resistor SAR and in opposite directions so that no current flows through current limit winding CL. However, when the armature current exceeds a predetermined value in response to increase in armature voltage, the voltage drop across resistor SAR exceeds the voltage drop across resistor R22 and a current flows from the lower, positive end of resistor SAR through resistor R20, current limit winding CL, resistor R22 and rectifier DR12 to the upper, negative end of resistor SAR. Energization of current limit winding CL decreases the output of power amplifier MA2. As a result, the corresponding decrease in armature voltage limits the armature current to a safe value. The amount of current limiting may be predetermined by the value of spillover bias voltage supplied by rectifier bridge RB4 and adjustment of resistor R20.

To stop the motor, master switch MS is turned to its off position to open contacts MS1 and MS5 and to close contacts MS3 and MS7. Contacts MS3 partially complete an energizing circuit for dynamic braking contactor DB, contacts MS7 complete a maintaining circuit for the operating coil of forward contactor F through contacts F7 and R6, contacts MS5 interrupt the original energizing circuit of contactor F, and contacts MS1 interrupt energization of main contactor M. The latter opens contacts M1 and M2 to disconnect power from the motor, and closes contacts M3 to complete the energizing circuit of dynamic braking contactor DB through contacts F5 and MS3. Contactor DB closes contacts DB1 and DB2 to complete a dynamic braking circuit from the left side of armature A through resistors SAR and R24, contacts DB1 and F1, bridge RB1, field winding FW1, resistor R6, operating coil $b$ of relay CR, contacts R3, bridge RB1, contacts F2, dynamic braking resistor DBR and contacts DB2 to the right side of armature. Armature A supplies the field in this circuit and forces current through resistor DBR to brake the motor. Field winding FW2 is supplied by the armature in parallel with winding FW1 in a circuit extending through resistor R4, coil $a$ of relay CR and winding FW2 to contacts R3.

To operate the motor in the reverse direction, master switch MS is turned to its reverse operating position to close contacts MS2 and MS6, to maintain contacts MS3 closed and to open contacts MS4 and MS7. Contacts MS7 interrupt energization of forward contactor F. Contacts MS6 effect energization of reverse contactor R through contacts F6. Contactor R closes contacts R1 and R2 to partially complete a reverse energizing circuit for field windings FW1 and FW2, opens contacts R3 to insert resistor R8 in circuit, closes contacts R4 to effect energization of main contactor M through contacts MS2, closes contacts R5, opens contacts R6 and closes R7 to partially complete a self-maintaining circuit. Contactor M closes contacts M1 and M2 to complete the reverse energizing circuit for the motor and opens contacts M3.

The reverse energizing circuit of the motor may be traced from line L4 through contacts M1 and R1, rectifier bridge RB2, winding FW1, resistor R4, coil $a$ of relay CR, contacts F3, rectifier bridge RB2, contacts R2, bridge RB5, resistor SAR, armature A, bridge RB5, rectifier DR16 and the right-hand power winding P of amplifier MA2, and contacts M2 to line L5. The circuit of each alternate half-cycle may be traced from line L5 through contacts M2, the left-hand power winding P and rectifier DR14 of amplifier MA2, bridge RB5, resistor SAR, armature A, bridge RB5, contacts R2, bridge RB2, field winding FW1, resistor R4, coil $a$ of relay CR, contacts F3, bridge RB2, and contacts R1 and M1 to line L4. Field winding FW2 is energized in the reverse direction in parallel with winding FW1 in a circuit extending through resistor R6, coil $b$ of relay CR, and winding FW2 to contacts F3. It will be apparent that reverse operation of the motor is attained by reversing the field while the armature is always energized in the same direction. The opening of contacts R3 provides a high resistance conductive path in shunt of winding FW2 extending from the right-hand end of the latter through resistor R8, rectifier bridge RB1, resistor R4 and coil $a$ of relay CR to the left-hand end of winding FW2 to permit current flow in response to the inductive reactance of winding FW2. Coils $a$ and $b$ of relay CR energize in series, respectively, with the field windings to close contacts CR1. The latter complete a maintaining circuit for reverse contactor R through contacts R7 and F6.

Let it be assumed that motor M is operating in the forward direction and master switch MS is turned all the way to its reverse operating position to plug the motor. Forward contactor F is maintained energized through contacts CR1, F7 and R6. Contacts MS1 open to interrupt energization of main contactor M. The latter opens contacts M1 and M2 to disconnect power from the motor, and closes contacts M3 to complete an energizing circuit through contacts MS3 and F5 and the operating coil of dynamic braking contactor DB. The latter closes contacts DB1 and DB2 to complete the dynamic braking circuit through resistor DBR as hereinbefore described, and opens contacts DB3 to further interrupt the circuit of contactor M.

When the motor approaches zero speed under dynamic braking and the field energization supplied by armature R decreases to a predetermined value, relay CR opens contacts CR1 to interrupt the maintaining circuit of forward contactor F. The latter opens contacts F1 and F2 to interrupt the dynamic braking circuit, opens contacts F5 to interrupt energization of contactor DB, and closes contacts F6 to effect energization of reverse contactor R through contacts MS6. The latter effects reverse energization of the motor as hereinbefore described.

Referring to Figs. 3A, 3B, 3C and 3D, there is shown a shunt motor control system with regulation. The system is provided with a direct current motor M (Fig. 3A) having an armature A and a pair of shunt field windings SF1 and SF2. The shunt field windings are connected in a bridge network as described in connection with Fig. 1 except that there is additionally provided in series with winding SF1 the operating coil of a field failure relay FL. Relay FL is a protective device which responds to disconnect power from the armature in the event of a failure of the field energization as hereinafter described.

The field bridge network is supplied with full-wave rectified alternating current through rectifier bridge RB1 for forward strengthening and reverse weakening of the field and through rectifier bridge RB2 for reverse strengthening and forward weakening of the field. To this end, there is provided a field strengthening network FSN and a field weakening network FWN hereinafter more fully described.

The system is supplied with power from lines L6, L7 and L8 which may be connected to a suitable three-phase alternating current power supply source (not shown). The armature power supply network is provided with a three-phase rectifier network RN, power amplifiers MA3, MA4 and MA5, a current limit amplifier MA6, a preamplifier MA7, and a regenerative braking amplifier MA8. The aforementioned amplifiers are preferably of the magnetic type.

Each power amplifier MA3–5 is provided with a pair of power windings P each having a saturating rectifier DR14 and DR16 in series as in amplifier MA2 in Fig. 2 for unidirectional conduction therethrough, IR drop compensation windings COMP, bias windings B, regulating windings RG, and current limit windings CL. Lines L6, L7 and L8 are connected through normally open contacts M1, M2 and M3 of a main contactor M, power windings P and associated rectifiers of power amplifiers MA3, MA4 and MA5 and the three legs of rectifier network RN, respectively, and then through a series armature resistor SAR and normally open contacts RB1 of a regenerative braking control relay RB across armature A. Network RN is provided with series-connected pairs of rectifiers DR1 and DR4, DR2 and DR5, and DR3 and DR6 in the respective legs thereof with the outputs of power amplifiers MA3, MA4 and MA5 being connected to the junctions of the respective rectifier pairs.

Compensation windings COMP of the power amplifiers are connected in series with one another and through an adjustable resistor R30 across series armature resistor SAR for controlling the armature voltage as a function of the load current. Bias windings B of the power amplifiers are connected in series through an adjustable resistor R32 across the positive and negative output terminals of a rectifier bridge RB3 (Fig. 3B), the input terminals of the latter being connected through a transformer PT3 across power supply lines L7 and L8. Regulating windings RG of the power amplifiers are connected in series through resistors R34 and R36 across the positive and negative output terminals of preamplifier MA7. The junction of resistors R34 and R36 is connected through a filter network comprising series connected resistor R38 and capacitor C3 to the negative terminal of preamplifier MA7 so that the filter network is connected in shunt of resistor R36 and the preamplifier. Current limit windings CL of the power amplifiers are connected in series with resistors R40 and R42 across the positive and negative output terminals of current limit amplifier MA6. A filter network comprising series connected resistor R44 and capacitor C4 is connected from the junction of resistors R40 and R42 across the current limit amplifier.

Current limit amplifier MA6 is provided with a pair of power windings P, signal windings S and reference windings RF. Power windings P are connected in a rectifier bridge similar to the bridge in preamplifier MA1 of Fig. 2 and comprising rectifiers DR7–10, the bridge having input terminals connected to transformer PT3 and positive and negative output terminals which constitute the output terminals of the amplifier connected to the current limit windings CL of the power amplifiers as hereinbefore described. Signal windings S are connected in series with an adjustable resistor R46 across series armature resistor SAR. Reference windings RF are connected in series with a resistor R48 and an armature current limit adjusting rheostat RH1 across the positive and negative output terminals of rectifier bridge RB3 (Fig. 3B).

Preamplifier MA7 is provided with a pair of power windings P connected in a bridge comprising rectifiers DR7–10 hereinbefore described and having its input terminals connected to transformer PT3. The positive and negative output terminals of the bridge are connected to regulating windings RG of the power amplifiers as hereinbefore described. Preamplifier MA7 is also provided with signal windings S, reference windings RF and bias windings B. Signal windings S are connected in series with resistors SAR and R50 in a half-wave rectifier DR12 across armature A. Reference windings RF are connected in series with an adjustable portion of a speed setting rheostat RH2 and parallel connected normally open contacts FR1 and RR1 of forward and reverse control relays FR and RR, respectively, across the output terminals of rectifier bridge RB3. Bias windings B are connected in series with an adjustable resistor R52 across the output terminals of rectifier bridge RB3.

Regenerative braking amplifier MA8 is provided with a pair of power windings P connected in a bridge comprising rectifiers DR7–10 hereinbefore described and having its input terminals connected to transformer PT3. The positive and negative output terminals of the bridge are connected to the operating coil of a regenerative braking relay 1RB. Alternatively, the output terminals may be connected, as indicated by the broken lines, to the energizing coil of an eddy current brake ECB which may be mechanically coupled to the motor shaft. Amplifier MA8 is also provided with signal windings S connected in series with a resistor R54 across series armature resistor SAR. Amplifier MA8 is further provided with bias windings B connected in series with an adjustable resistor R56 across the output terminals of rectifier bridge RB3.

The aforementioned dynamic braking resistor DBR is connectable in series with resistor SAR and normally open contacts DB1 of a dynamic braking contactor DB across armature A. A regenerative braking resistor RBR1 is connectable through normally open contacts 2RB1 of a regenerative braking contactor 2RB in shunt of contacts DB1 to form a regenerative braking loop circuit across armature A. A regenerative braking control resistor RBR2 is connected across the aforementioned contacts RB1 in the armature circuit for increasing the regenerative braking torque during plugging as hereinafter described. The operating coil of a full voltage relay VR is connected in series with resistor SAR and contacts RB1 across armature A.

Field strengthening network FSN in Fig. 3C is provided with a field supply amplifier MA9, a preamplifier MA10 and a decelerating current limit amplifier MA11. Amplifier MA9 is provided with a pair of power windings P, the left-hand power winding being connected to the positive output terminal of the amplifier through a saturating rectifier DR14 and the negative output terminal being connected to the right-hand power winding through a saturating rectifier DR16. A pair of resistors R58 and R60 are connected in series between the positive and negative output terminals. A transformer PT4 (Fig. 3B) having a primary winding connected across lines L6 and L8 and a pair of secondary windings S1 and S2 is provided for supplying network FSN and for energizing the motor field windings.

To this end, one side of secondary winding S1 is connectable through normally open contacts F1 of a forward contactor F to a first input terminal of field supply rectifier bridge RB1, or alternatively, through normally open contacts R1 of a reverse contactor R to a first input terminal of field supply rectifier bridge RB2. As hereinbefore described bridges RB1 and RB2 are provided for forward and reverse energization, respectively, of the field windings. The other side of secondary winding S1 is connected to the junction of power windings P of amplifier MA9. The junction of resistors R58 and R60 is connected through normally open contacts F2 to the other input terminal of rectifier bridge RB1, or alternatively, through normally open contacts R2 to the other input terminal of rectifier bridge RB2. The positive and negative output terminals of amplifier MA9 are connected through a resistor R62 to signal windings S of preamplifier MA10 to supply negative feedback for maintaining the field current constant as hereinafter more fully described.

Field supply amplifier MA9 is also provided with bias windings B, current limit windings CL and regulating windings RG. Bias windings B are connected in series with an adjustable resistor R64 across the output terminals of rectifier bridge RB3. Current limit windings CL are connected in series with an adjustable resistor R66 to the positive and negative output terminals of decelerating current limit amplifier MA11. Regulating windings RG are connected in series with a resistor R68 to the positive and negative output terminals of preamplifier MA10.

Preamplifier MA10 is provided with a pair of power windings P connected in a bridge comprising rectifiers DR7–10 hereinbefore described and having its input terminals connected to secondary winding S2 of transformer PT4. The positive and negative output terminals of the bridge which constitute the output terminals of the preamplifier are connected for regulating the field supply amplifier MA9 as hereinbefore described. Preamplifier MA10 is also provided with signal windings S, reference windings RF, and bias windings B. Signal windings S are connected for energization as a function of the field current as hereinbefore described. Reference windings RF are connected in series with a resistor R70 across the output terminals of rectifier bridge RB3. Bias windings B are connected in series with an adjustable resistor R72 across the output terminals of rectifier bridge RB3.

Decelerating current limit amplifier MA11 is provided with a pair of power windings P connected in a bridge comprising rectifiers DR7–10 hereinbefore described and having its input terminals connected to secondary winding S2 of transformer PT4. The positive and negative output terminals of the bridge which constitute the output terminals of the amplifier are connected for energizing the current limit windings CL of field supply amplifier MA9. Decelerating current limit amplifier MA11 is also provided with signal windings S and reference windings RF. Signal windings S are connected in series with a resistor R74 across series armature resistor SAR for controlling field energization as a function of armature current. Reference windings RF are connected in series with an adjustable resistor R76 across the output terminals of rectifier bridge RB3.

Field weakening network FWN in Fig. 3D is similar to field strengthening network FSN in Fig. 3C as indicated by the like reference characters, with certain exceptions. Field weakening network FWN is additionally provided with a field weakening rheostat RH3 in series connection with reference windings RF of preamplifier MA10'. There is also provided normally open contacts VR1 of the aforementioned full voltage relay VR and normally closed contacts DB2 of the aforementioned dynamic braking contactor DB in series connection with reference windings RF of preamplifier MA10'. A transformer PT5 (Fig. 3B) having a primary winding connected across lines L7 and L8 and a pair of secondary windings S1 and S2 is provided for energizing network FWN and for weakening the motor field windings for additional acceleration.

While amplifiers MA9', MA10' and MA11' of network FWN are identical to the corresponding amplifiers MA9, MA10 and MA11 of network FSN, it will be apparent as the description proceeds that amplifiers MA9' and MA10' are employed to weaken the field for acceleration and that amplifier MA11' is an accelerating current limit amplifier. To this end, secondary winding S1 of transformer PT5 is connected to the input terminals of preamplifier MA10' and accelerating current limit amplifier MA11' in parallel. One side of secondary winding S2 is connectable through normally open contacts F3 of forward contactor F to the first input terminal of field supply rectifier bridge RB2, or, alternatively, through normally open contacts R3 of reverse contactor R to the first input of field supply rectifier bridge RB1. The other side of secondary winding S1 is connected to the junction of power windings P of field supply amplifier MA9'. The junction of resistors R58 and R60 is connected through normally open contacts F4 to the other input terminal of rectifier bridge RB2, or alternatively, through normally open contacts R4 to the other input terminal of rectifier bridge RB1. The remaining connections of network FWN are similar to those described in connection with network FSN.

The system further comprises a control network CN shown in Fig. 3B connected for energization partly through transformer PT3, and partly through transformer PT3 and rectifier bridge RB3. Operating coils b of full field relays 1FR and 2FR are connected in parallel across the positive and negative output terminals of rectifier bridge RB3. The remainder of network CN which is connected across the secondary winding of transformer PT3 is provided with a forward switch FS for operating forward contactor F, a reverse switch RS for operating reverse contactor R, and a stop switch SS, these switches being of the manual pushbutton type or the like. Network CN is also provided with a main contactor M for connecting lines L6–8 to the armature control network and field weakening network FWN, a timing relay DT for timing reversal of the motor, a dynamic braking contactor DB, a regenerative braking contactor 2RB, a forward control relay FR, a reverse control relay RR, and a regenerative braking control relay RB. The circuit connections of the aforementioned elements of network CN will become apparent from the description of operation hereinafter appearing.

Speed setting rheostat RH2 and field weakening rheostat RH3 are preferably mechanically interconnected for operation in unison as indicated by the broken line. Rheostat RH2 has its resistance arranged on the right-hand side and rheostat RH3 has its resistance arranged on the left-hand side as symbolically depicted by the heavy arcuate lines. With this construction, full voltage must always be applied to the armature before field weakening can be initiated. To this end, movement of the arms of the rheostats counterclockwise effects increase in armature voltage to its full value when the arms are in their vertical positions and further counterclockwise movement of the arms effects field weakening as hereinafter more fully described.

The operation of the adjustable voltage reversing plugging system of Fig. 3 will now be described. Let it be assumed that a suitable three-phase power supply source is connected to lines L6, L7 and L8. As a result, power is supplied from lines L6 and L8 through the primary winding of transformer PT4 and from the left-hand secondary winding S2 thereof to the input terminals of decelerating current limit amplifier MA11 and preamplifier MA10 in field strengthening network FSN in parallel. Power is applied from lines L7 and L8 through transformer PT3 to the input terminals of regenerative braking amplifier MA8, preamplifier MA7 and current limit amplifier MA6 in parallel. Power is also applied through transformer PT3 across control network CN shown in Fig. 3B. Power is further supplied through transformer PT3 across the input terminals of rectifier bridge RB3 and from the positive and negative output terminals of the latter, in a first circuit, through operating coils b of full field relays 1FR and 2FR in parallel, and in a second circuit having four parallel branches, extending through adjustable resistor R56 and bias windings B of regenerative braking amplifier MA8; through adjustable resistor R52 and bias windings B of preamplifier MA7; through armature current limit adjusting rheostat RH1, resistor R48 and reference windings RF of current limit amplifier MA6; and through adjustable resistor R32 in series with bias windings B of power amplifiers MA3, MA4 and MA5.

Power is also supplied from the positive and negative output terminals of rectifier bridge RB3 to field strengthening network FSN, in four parallel branches, extending through adjustable resistor R76 and reference windings RF of current limit amplifier MA11; through adjustable resistor R72 and bias windings B of preamplifier MA10; through resistor R70 and reference windings RF of preamplifier MA10; and through adjustable resistor R64 and bias windings B of field supply amplifier MA9.

Power is further supplied from the positive and negative output terminals of rectifier bridge RB3 to field weakening network FSN, in three parallel branches, extending through adjustable resistor R76 and reference windings RF of accelerating current limit amplifier MA11'; through adjustable resistor R72 and bias windings B of preamplifier MA10'; and through adjustable resistor R64 and bias windings B of field supply amplifier MA9'.

Operating coils b of polarized relays 1FR and 2FR although energized, maintain contacts 1FR1 and 2FR1 open until the shunt field windings are energized as hereinafter described.

Under these conditions and before the control devices in network CN are manipulated, armature power supply amplifiers MA3, MA4 and MA5 and preamplifier MA6 are biased to cut-off by the aforementioned energization of their bias windings B. The energization of reference winding RF of current limit amplifier MA6 may be adjusted at rheostat RH1 to bias the amplifier a predetermined amount beyond cut-off so that the amplifier does not start to turn on until the armature current exceeds a predetermined value as hereinafter more fully described. Regenerative braking amplifier MA8 has its bias windings B energized to bias the amplifier full "on." As a result, relay 1RB energizes and closes contacts 1RB1 to energize regenerative braking contactor 2RB. The latter closes contacts 2RB1 to complete the aforementioned regenerative braking circuit.

In field strengthening network FSN, bias windings B bias field supply amplifier MA9 and preamplifier MA10 to cut-off. However, concurrent energization of reference windings RF drives preamplifier MA10 "on." As a result, the output of preamplifier MA10 is applied through resistor R68 to energize regulating windings RG of field supply amplifier MA9 to drive the latter "on." Energization of reference windings RF of decelerating current limit amplifier MA11 biases the latter to cut-off.

In field weakening network FWN, bias windings B bias field supply amplifier MA9' and preamplifier MA10' to cut-off. Energization of reference windings RF of accelerating current limit amplifier MA11' biases the latter to cut-off.

*Forward operation*

To operate motor M in the forward direction, forward switch FS is momentarily pressed to close contacts FS1 and open contacts FS2 and FS3. Interlocking contacts FS2 prevent concurrent energization of reverse contactor R and contacts FS3 interrupt a point in the circuit of the operating coil of dynamic braking contactor DB. Contacts FS1 complete an alternating current energizing circuit for the operating coil of forward contactor F through contacts SS1, RS1 and R5. As a result, contactor F closes contacts F1 and F2 to complete a forward energizing circuit for shunt field windings SF1 and SF2. This circuit may be traced from secondary winding S1 of transformer PT4 through contacts F1, rectifier bridge RB1, operating coil $a$ of relay 1FR, field winding SF1, coil of relay FL, resistor R4, bridge RB1, contacts F2, upper input terminal of amplifier MA9, resistor R60, negative output terminal of amplifier MA9, rectifier DR16, right-hand power winding P and lower input terminal of amplifier MA9 to the other side of secondary winding S1 of transformer PT4. The circuit of the alternate half-cycle may be traced from secondary winding S1 of transformer PT4 through the lower input terminal of amplifier MA9, the left-hand power winding P, rectifier DR14, positive output terminal, resistor R58, contacts F2, bridge RB1, operating coil $a$ of relay 1FR, field winding SF1, coil of relay FL, resistor R4, bridge RB1 and contacts F1 to secondary winding S1 of transformer PT4. Shunt field winding SF2 is energized in parallel with winding SF1 in a circuit extending from the positive output terminal of rectifier bridge RB1 through resistor R6, operating coil $a$ of relay 2FR and winding SF2 to the negative output terminal of bridge RB1. Filter capacitor C being connected between the center taps of resistors R4 and R6 charges on each rectified half-cycle and discharges through the field windings to increase the field current. The circuit of capacitor C may be traced from the positive output terminal of bridge RB1 through the right-hand portion and center tap of resistor R6, capacitor C and the center tap and right-hand portion of resistor R4 to the negative output terminal of bridge RB1.

A signal proportional to the motor field current is fed back from the positive and negative output terminals of amplifier MA9 through resistor R62 to signal windings S of preamplifier MA10. This maintains the field current constant. Thus, if the field current tends to increase, windings S regulate to limit the output of preamplifier MA10, and if the field current tends to decrease, signal windings S correspondingly regulate the output of the preamplifier to stabilize the field current at a predetermined value.

Forward contactor F also closes contacts F3 and F4 to connect field weakening network FWN to the field windings to become effective when full voltage relay VR is energized as hereinafter described. Contactor F further closes contacts F5 to complete a self-maintaining circuit through contacts DT1 in shunt of contacts SS1 and FS1, closes contacts F8 to complete an energizing circuit for contactor M, opens interlocking contacts F6 to prevent concurrent energization of reverse contactor R, and closes contacts F7 to partially complete the energizing circuit of control relay FR.

Main contactor M energizes in a circuit extending from the secondary winding of transformer PT3 through contacts DT1 and DB3, the operating coil of contactor M and contacts F8 and closes contacts M1, M2 and M3. As a result, power is applied from lines L7 and L8 through the primary winding and secondary winding S1 of transformer PT5 across the input terminals of accelerating current limit amplifier MA11' and preamplifier MA10' in field weakening network FWN in parallel. Power is also applied from lines L6, L7 and L8 to the input terminals of power amplifiers MA3, MA4 and MA5.

When shunt field windings SF1 and SF2 are partially energized, field failure relay FL energizes and closes contacts FL1 to partially complete a maintaining circuit as hereinafter described. When shunt field windings SF1 and SF2 are fully energized, operating coil $a$ of polarized full field relay 1FR energizes to aid the magnetic force of its operating coil $b$ as indicated by the arrows on these coils and contacts 1FR1 close. As will be apparent, operating coil $a$ of relay 2FR is energized in a direction to oppose the magnetic force of its coil $b$ to prevent closure of contacts 2FR1. Contacts 1FR1 complete an energizing circuit for the operating coil of relay FR through contacts SS1, DB4 and F7. As a result, contacts FR3 complete a self-maintaining circuit in shunt of contacts 1FR1 and contacts FR1 complete an energizing circuit from the positive output terminal of rectifier bridge RB3 through speed setting rheostat RH2 and reference windings RF of preamplifier MA7 to the negative output terminal of bridge RB3. Energization of reference windings RF drives preamplifier MA7 "on." The output of preamplifier MA7 is applied through resistors R34 and R36 to energize regulating windings RG of power amplifiers MA3, MA4 and MA5 in series, such output being filtered by resistor R38 and capacitor C3 connected across resistor R36 and the preamplifier. This circuit may be traced from the left-hand side of the secondary winding of transformer PT3 through the lower input terminal and left-hand power winding P of preamplifier MA7, rectifier DR7, positive output terminal, resistors R36 and R34, regulating windings RG, negative output terminal and rectifier DR8 to the right-hand side of the secondary winding of transformer PT3. The circuit of each alternate half-cycle may be traced from the right-hand side of the secondary winding of transformer PT3 through the upper input terminal, rectifier DR9 and the positive output terminal of preamplifier MA7, resistors R36 and R34, regulating windings RG, and the negative output terminal, rectifier DR10, the right-hand power winding P and the lower input terminal of preamplifier MA to the left-hand side of the secondary winding of transformer PT3. Contacts FR2 complete an energizing circuit through contacts 1FR1 for the operating coil of contactor RB to close contacts RB1 and shunt resistor RBR2 in the armature circuit.

Energization of regulating windings RG drives power amplifiers MA3, MA4 and MA5 "on" to energize armature A of the motor. The first phase armature energization circuit extends from line L6 through contacts M1, input terminal, left-hand power winding P and rectifier DR14 of amplifier MA3, rectifier DR1, series armature resistor SAR, armature A, contacts RB1, rectifier DR6, and rectifier DR16, the right-hand power winding P and input terminal of amplifier MA5 and contacts M3 to line L8. Similar energizing circuits may be traced for the other two phases of the power supply source from line L7 to line L6 and from line L8 to line L7.

The current flowing through series armature resistor SAR energizes signal windings S of regenerative braking amplifier MA8 in series with resistor R54 to drive the amplifier to cut-off. As a result, relay 1RB deenergizes and opens contacts 1RB1 which in turn opens contacts 2RB1 in the regenerative braking circuit hereinbefore described.

As a result, the motor starts rotating in the forward direction. The armature voltage and consequently the speed of the motor may be increased by operating speed setting rheostat RH2 in the direction of the arrow.

A signal proportional to armature voltage is fed back from the left-hand side of armature A through resistors SAR and R50, rectifier DR12 and signal windings S of preamplifier MA7 to the right-hand side of armature A to energize signal windings S. Increased energization of signal winding S decreases the output of the preamplifier thus to regulate increase in armature voltage. Rectifier DR blocks energization of winding S in the opposite direction during regenerative plugging.

A signal proportional to armature current is fed back from the lower, positive end of series armature resistor SAR through resistor R46 and signal windings S of current limit amplifier MA6 to the upper, negative end of resistor SAR to limit the armature current. When speed setting rheostat RH2 is operated to increase the armature voltage, the armature draws a high current from the power supply lines. As a result, the voltage drop across resistor SAR is correspondingly increased to increase the energization of signal windings S of current limit amplifier MA6. The output from amplifier MA6 to windings CL of power amplifiers MA3, MA4 and MA5 is increased to decrease the output of the latter and consequently limit the rate of rise in armature voltage. As a result, the armature current is limited to a safe value until a steady state condition is reached. The amount of current limiting may be adjusted by operating rheostat RH1 in the clockwise direction to increase the current limit and, in the counterclockwise direction to decrease the current limit. Normally, rheostat RH1 may be adjusted to bias amplifier MA6 a predetermined amount beyond cut-off so that current limiting is not effective until the armature current exceeds a predetermined value.

The IR drop compensation windings COMP of power amplifiers MA3, MA4 and MA5 are provided to help maintain the speed of the motor constant under variable load conditions. As the speed of a shunt motor at a given field strength is directly proportional to the difference between the applied armature voltage and the armature IR drop, increase in motor load would tend to decrease the speed. Therefore, in order to maintain the speed constant as the armature IR drop increases with load, it is necessary to increase the applied armature voltage as a function of the load.

To accomplish this, a signal proportional to the load current is applied from the lower, positive end of resistor SAR through adjustable resistor R30, and windings COMP in series to the upper, negative end of resistor R. Thus, each increase in load current is fed back to windings COMP to increase the output of power amplifiers MA3, MA4 and MA5. As a result, the armature voltage is increased in response to increase in motor load to maintain the speed constant.

Speed setting rheostat RH2 and field weakening rheostat RH3 are mechanically connected to one another and arranged so that operation of the movable arms in unison in the direction of the counterclockwise arrows applies full voltage to the armature before field weakening can be initiated. Thus, the motor speed is increased first by increasing the armature voltage and is then increased further by weakening the field.

When full voltage has been applied to the armature by operation of rheostat RH2, full voltage relay VR energizes in a circuit extending from the left-hand side of armature A through resistor SAR, operating coil of relay VR and contacts RB1 to the right-hand side of armature A. Contacts VR1 close to complete an energizing circuit from the positive output terminal of rectifier bridge RB3 through resistor R70, rheostat RH3, reference windings RF of field weakening preamplifier MA10' and contacts VR1 and DB2 to the negative output terminal of bridge RB3. Energization of reference windings RF drives preamplifier MA10' "on." The output of preamplifier MA10' is applied across regulating winding RG of field supply amplifier MA9'. This circuit may be traced from secondary winding S1 of transformer PT5 to the input terminals of preamplifier MA10' and from the positive and negative output terminals of the latter through resistor R68 across regulating winding RG.

Energization of regulating winding RG drives field supply amplifier MA9' "on." As a result, a field weakening circuit is established from the secondary winding S2 of transformer PT5 through contacts F3, rectifier bridge RB2, operating coil of relay FL, field winding SF1, coil *a* of relay 1FR, resistor R6, bridge RB2, contacts F4 and resistor R60, rectifier DR16 and the right-hand power winding P of amplifier MA9' to secondary winding S2 of transformer PT5. A similar circuit for the alternate half cycle may be traced through the left-hand portion of amplifier MA9', contacts F4 and F3, and rectifier bridge RB2 to field winding SF1. Field winding SF2 is energized from the positive terminal of bridge RB2 through resistor R4, field winding SF2 and operating coil *a* of relay 2FR to the negative terminal of bridge RB.

As will be apparent, the output of field weakening network FWN is applied to the shunt field windings to oppose the energization thereof supplied from field strengthening network FSN. The amount of field weakening may be adjusted by operating rheostat RH3. Rotation of the movable arm of the rheostat in the direction of the counterclockwise arrow accelerates the motor to its maximum speed.

A signal proportional to the field weakening current is fed back from the positive and negative output terminals of amplifier MA9' through resistor R62 to signal windings S of preamplifier MA10' to maintain the field weakening current constant for a given setting of rheostat RH3. Thus, if the field weakening current increases, windings S decrease the output of preamplifier MA10' and, if the field weakening current decreases, signal windings S correspondingly increase the output of the preamplifier to stabilize the field weakening current at a selected value.

Armature current limiting during acceleration by field weakening is provided by amplifier MA11'. A signal proportional to armature current is fed back from the lower, positive end of resistor SAR through resistor R74 and signal windings S of accelerating current limit amplifier MA11' to the upper, negative end of resistor SAR. When rheostat RH3 is operated to weaken the field, the armature draws a high current from the power supply lines. A signal proportional to such increase in armature current is applied from resistor SAR to signal windings S to increase the output of amplifier MA11'. Such increased output is applied from the positive and negative terminals of amplifier MA11' through resistor R66 across current limit windings CL of amplifier MA9' to decrease the output of the latter. The decrease in output of field weakening network FWN in effect strengthens the field to decrease the armature current. Thus, each time the field is weakened, the armature current is limited to a predetermined safe value. Resistor R76 may be adjusted to bias current limiting amplifier MA11' a predetermined amount beyond cut-off so that current limiting is not effective until the armature current exceeds a predetermined maximum value.

*Stopping with dynamic braking*

To stop the motor, stop switch SS is pressed to open contacts SS1 and close contacts SS2. Contacts SS1 interrupt energization of relay FR and contactor RB. Relay FR opens contacts FR1 to disconnect reference voltage from preamplifier MA7 whereupon bias windings B bias the latter to cut-off. As a result, power amplifiers MA3, MA4 and MA5 are biased to cut-off and the applied voltage to armature A is terminated. Contacts FR2 further interrupt the circuit to contactor RB and contacts FR3 interrupt the maintaining circuit to relay FR. Contactor RB opens contacts RB1 without effect at this time.

Contacts SS2 complete an energizing circuit through contacts RS3 and FS3 for the operating coils of dynamic braking contactor DB and timing relay DT in parallel. The latter closes contacts DB1 to complete a dynamic braking loop circuit from the left-hand side of armature A through resistor SAR, dynamic braking resistor DBR and contacts DB1 to the right-hand side of armature A. Contacts DB2 open to disconnect reference voltage from preamplifier MA10' to bias the same to cut-off. As a result, the output of field weakening network FWN is terminated to effectively strengthen the field energization supplied from network FSN.

Contactor DB also opens contacts DB3 to interrupt energization of contactor M. The latter opens contacts M1, M2 and M3 to disconnect power from the field weakening amplifiers and power amplifiers MA3, MA4 and MA5. Contactor DB further opens contacts DB4 to interrupt another point in the circuit of relay FR and closes contacts DB5 to complete a maintaining circuit for itself and relay DT.

The armature applied voltage having been disconnected and the field energization maintained, the generated voltage of the rotating armature forces current through resistor DBR to dynamically brake the motor for a predetermined time interval. After such time interval, timed opening contacts DT1 interrupt energization of forward contactor F. The latter opens contacts F1, F2, F3 and F4 to interrupt the field energizing circuits, and opens contacts F5, F7 and F8 and closes contacts F6 to reset control network CN in its normal condition. Contactor DB, however, remains energized until operation of the motor is again initiated or the power line switch (not shown) is opened.

Regenerative braking

Let it be assumed that the motor is operating in the forward direction as hereinbefore described. When the speed of the motor is decreased by turning rheostats RH3 and RH2 in the clockwise direction thereby to decrease the load current below a predetermined value, the operating coil of regenerative braking relay 1RB energizes. It will be recalled that the energization of bias windings B of regenerative braking amplifier MA8 is adjusted at resistor R56 to bias the amplifier to its "on" condition. When the load current is decreased, the signal fed back from the positive lower end of resistor SAR through signal windings S of amplifier MA8, and resistor R54 to the upper negative end of resistor SAR is decreased. As a result, amplifier MA8 is driven "on" to energize relay 1RB. The latter closes contacts 1RB1 in network CN (Fig. 3B) to complete an energizing circuit for the operating coil of contactor 2RB which in turn closes contacts 2RB1 to complete a regenerative braking circuit. This circuit extends from the left-hand side of armature A through resistor SAR, dynamic braking resistor DBR, regenerative braking resistor RBR1 and contacts 2RB1 to the right-hand side of armature A. As a result, current is forced through resistors DBR and RBR1 in series to brake the motor.

When the motor again takes on load and the voltage drop across resistor SAR increases, amplifier MA8 is biased to cut-off to deenergize relay 1RB and contactor 2RB to terminate regenerative braking.

Alternatively, if smoother transition between running and regenerative braking is desired, the output terminals of amplifier MA8 may be connected, as indicated by the partially broken lines, to energize an eddy current brake ECB which may be coupled to the motor shaft.

While a magnetic amplifier MA8 has been shown as preferable for controlling the regenerative braking means, it will be apparent that other devices, as for example a sensitive two-coil voltage relay, could be employed in place thereof in systems requiring less accuracy.

Reversing plugging

Let it be assumed that the motor is operating in the forward direction as hereinbefore described. To reverse the motor, reverse switch RS is pressed to open contacts RS1 and RS3 and close contacts RS2. Contacts RS1 interrupt energization of forward contactor F to open contacts F1, F2, F3, F4, F5, F7 and F8 and to close contacts F6. Contacts RS3 prevent operation of dynamic braking contactor DB. Contacts RS2 complete an energizing circuit for reverse contactor R in a circuit extending through contacts SS1 and FS2, operating coil of contactor R and contacts F6.

Opening of contacts F1 and F2 interrupts forward energization of the shunt field windings. As a result, full field relay 1FR opens contacts 1FR1 and field failure relay FL opens contacts FL1 to interrupt energization of relays FR and RB. Relay FR opens contacts FR1 to bias preamplifier MA7 and power amplifiers MA3, MA4 and MA5 to cut-off to remove power from armature A. Relay FR also opens contacts FR2 and FR3 to interrupt further points in the energizing circuits of relays FR and RB. Relay RB opens contacts RB1 to insert resistor RBR2 in the armature circuit as hereinafter described.

Contactor R closes contacts R1 and R2 to connect the output of field strengthening network FSN to the input terminals of rectifier bridge RB2 to energize the shunt field windings in the reverse direction. Thus, a circuit extends from the positive output terminal of bridge RB2 through relay FL, winding SF1, relay 1FR and resistor R6 to the negative terminal of bridge RB2. Shunt field winding SF2 is energized in parallel with winding SF1 through resistor R4, winding SF2, and the operating coil of relay 2FR.

Contactor R also closes contacts R3 and R4 to connect field weakening network FWN to rectifier bridge RB1. Contacts R5 open to prevent energization of forward contactor F, contacts R6 complete a self-maintaining circuit through contacts DT1, and contacts R7 partially complete an energizing circuit for relay RR. Contacts R8 close to reenergize contactor M.

Thus, the field energization of the motor has been reversed while the armature continues to rotate in the forward direction. Reversal of the field energization reverses the counter EMF voltage of the motor so that current flows through the power rectifiers in a circuit extending from the right-hand side of armature A through resistor RBR2, the three pairs of power rectifiers in parallel and resistor SAR to the left-hand side of armature A. As a result, regenerative braking is applied to the motor during plugging to zero speed.

The regenerative braking current is regulated by controlled energization of the field windings through operation of decelerating current limit amplifier MA11 in field strengthening network FSN. To this end, a signal is fed back from the lower, positive end of resistor SAR through resistor R74 and signal windings S of current limit amplifier MA11 to the upper, negative end of resistor SAR. Energization of signal windings S drives amplifier MA11 "on." The output of amplifier MA11 is applied through resistor R66 to current limit windings CL of field supply amplifier MA9 to decrease the output of the latter. As a result, the field energization is regulated to limit the armature current to a safe value. Resistor RBR2 which was inserted in series with the armature by opening of contacts RB1 at the start of this plugging-to-zero-speed period permits a higher motor field strength and consequently a higher braking torque for a given regenerative braking current.

When the armature approaches zero speed preparatory to reversal of rotation thereof, the energization of signal windings S of decelerating current limit amplifier MA11 is decreased to bias the latter to cut-off. As a result, the output of amplifier MA9 is increased to permit full field energization in the reverse direction. Field failure relay FL energizes and closes contacts FL1 to partially complete a maintaining circuit for relays RR and RB. When the field windings are fully energized, operating coil $a$ of relay 2FR is energized in a direction to aid the magnetic force of its coil $b$ thereby to close contacts 2FR1. The latter complete an energizing circuit for the operating coil of relay RR through contacts R7, DB4 and SS1. Relay RR closes contacts RR1 to drive preamplifier MA7 which in turn drives power amplifiers MA3, MA4 and MA5 to reapply armature voltage as hereinbefore described in connection with forward operation of the motor. Relay RR also closes contacts RR2 to complete a maintaining circuit for its operating coil through contacts FL1, and closes contacts RR3 to complete an energizing circuit for the operating coil of relay RB. The latter closes contacts RB1 to again shunt resistor RBR2 effectively out of circuit.

When the armature reaches zero speed and starts to rotate in the reverse direction, its speed can be adjusted by adjusting the armature voltage at rheostat RH2. As hereinbefore described in connection with forward operation, relay VR energizes at full armature voltage to provide an output from field weakening network FWN. Thus, the speed can be increased still further by operating field weakening rheostat RH3.

Figure 3A:
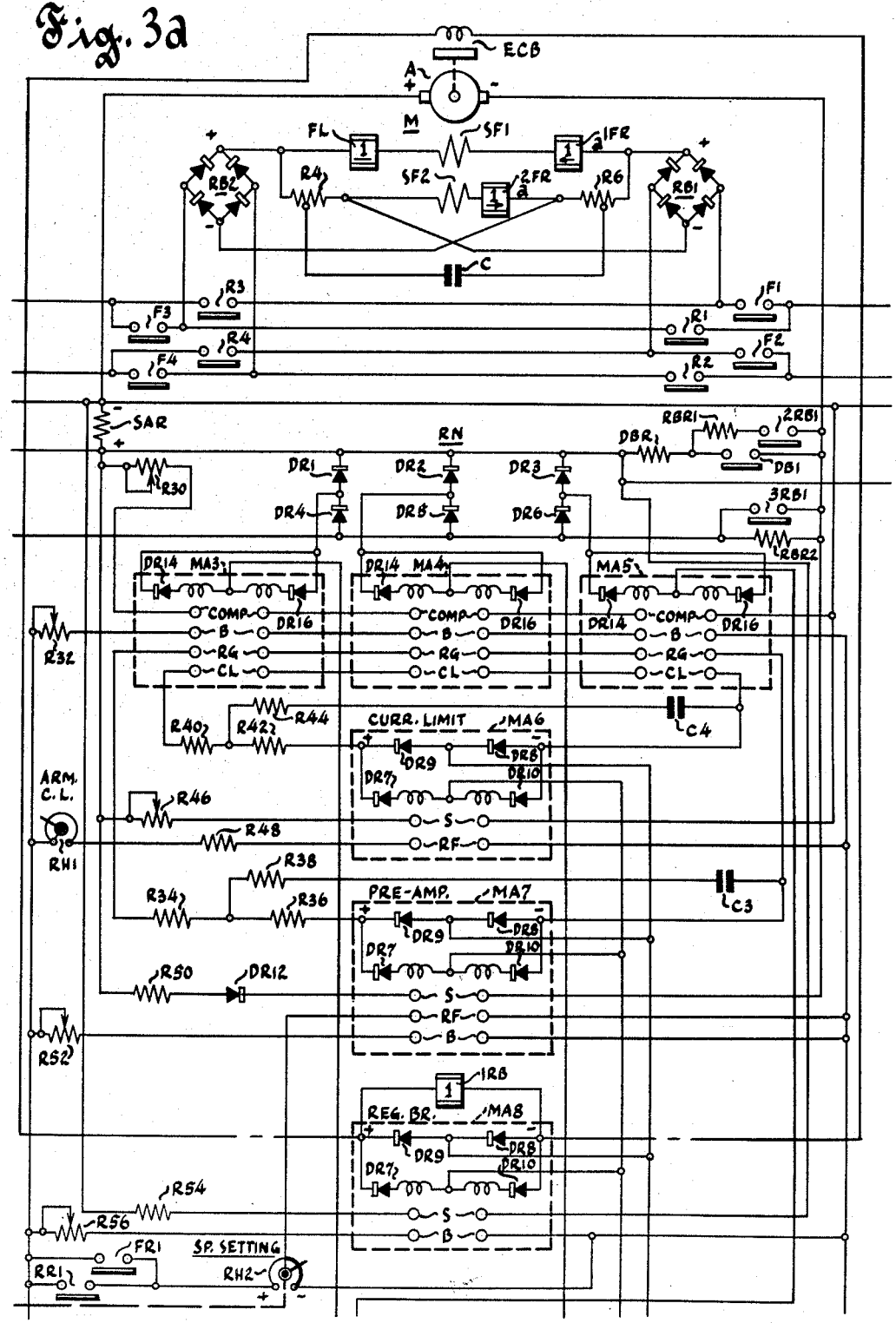
Figure 3B:
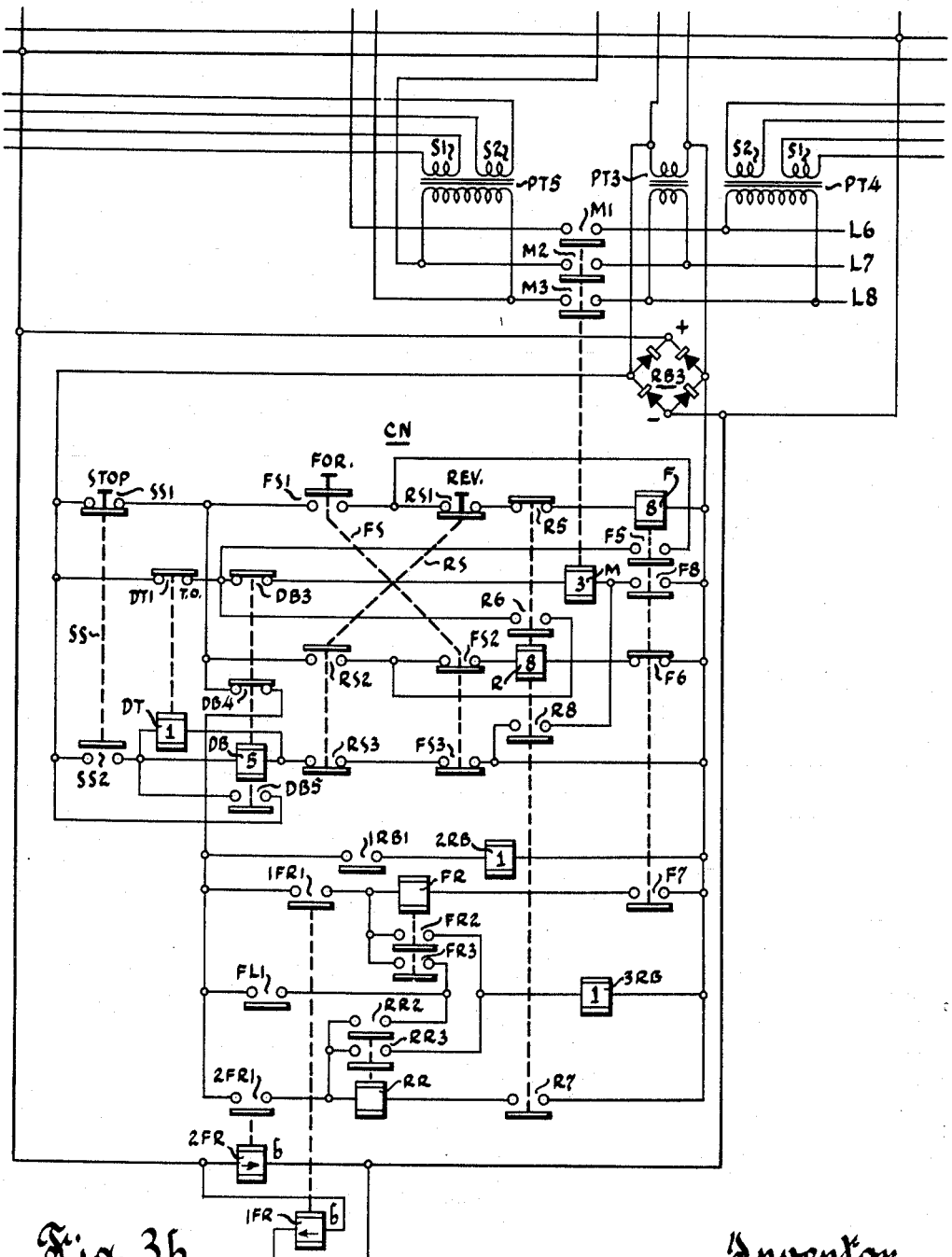

Current limit protection during reversing-plugging of the motor of Fig. 3A is graphically shown in Fig. 4. In the graph in Fig. 4, the ordinates represent magnetic amplifier current limit output while the abscissae represent motor current. As will be apparent, tapered current limit protection is afforded. Curves A, B and C on the graph represent the outputs of current limit amplifiers MA11, MA6 and MA11', respectively. The projections of the regulating, diagonal portions of these curves vertically onto the horizontal coordinate represent the ranges of armature current for the field strengthening stage, the armature voltage stage and the field weakening stage, respectively, as indicated on the graph.

Let it be assumed that the motor is operating full speed forward. Under these conditions, the motor current has a maximum value as indicated at the lower portion of Fig. 4. When the reverse button is pressed, decelerating current limit amplifier MA11 provides an output in accordance with curve A to limit the armature current to not more than the maximum value during the period of time during plugging when the motor is regenerating and the field is strengthened in the reverse direction. When the motor speed decreases, the motor current decreases also in accordance with curve A. When the motor approaches zero speed and full reverse field has been applied and the armature draws current from the power supply lines as indicated by the intersection of curves A and B, current limit amplifier MA6 affords current limiting in accordance with curve B. When conditions of full armature voltage have been reached and the motor approaches acceleration to base speed in the reverse direction, full voltage relay VR energizes to render field weakening network FWN effective. As a result, accelerating current limit amplifier MA11' effects current limiting from a point indicated by the intersection of curves B and C until the motor has accelerated to weak field speed in the reverse direction.

An essential feature of the invention resides in the novel field bridge networks wherein substantially all the current flows in the field winding circuits rather than through the turned off field supply rectifier bridge. Also the reversing contacts are arranged on the alternating current side of the field supply rectifier bridges to prevent discharge of the field therethrough. The result is to enhance the operating life of the reversing contacts.

It may be assumed that resistors R4 and R6 in each of Figs. 1A, 2 and 3A have equal ohmic values so that the field bridge networks are balanced. However, not all of the current supplied by rectifier bridge RB1 in Fig. 1A, for example, flows through the field windings. Some of the current will by-pass field windings SF1 and SF2 and flow from the positive output terminal of rectifier bridge RB1 through resistor R6, rectifier bridge RB2 and resistor R4 to the negative terminal of bridge RB1. The energy of this current is lost. To improve the efficiency of the network, capacitor C is connected across the center taps of resistors R4 and R6. As a result, capacitor C charges in response to the pulsating direct current and discharges through the shunt field windings to decrease the loss. The charging circuit may be traced from the positive terminal of bridge RB1 through the right-hand portion and center tap of resistor R6, capacitor C and the center tap and right-hand portion of resistor R4 to the negative terminal of bridge RB1. The discharge circuit may be traced from the right-hand side of capacitor C to the center tap of resistor R6 and then in parallel through the field windings to the center tap of resistor R4 and the left-hand side of capacitor C. As a result, the by-pass current loss through bridge RB2 is decreased from 10 to 12 percent to approximately 2 percent.

In the series motor circuit of Fig. 2 wherein the load current flows through the field windings, a capacitor such as C of Fig. 1A is not practical because it would have to be prohibitively large to conduct the load current. Therefore, resistors R8 and R10 respectively connected in parallel with normally closed contacts R3 and F3 are employed to decrease the by-pass currents. Thus, when rectifier bridge RB1 is supplying the field windings in the forward direction, contacts R3 are closed to shunt resistor R8 in the field supply circuit and contacts F3 are open to effectively insert high resistor R10 in the by-pass circuit. This by-pass circuit extends from the positive terminal of bridge RB1 through resistor R4, coil $a$ of relay CR, resistor R10, bridge RB2, resistor R6, coil $b$ of relay CR and contacts R3 to the negative terminal of bridge RB1. Alternatively, when bridge RB2 is supplying the field windings in the reverse direction, contacts F3 are closed to shunt resistor R10 in the field supply circuit and contacts R3 are open to effectively insert high resistor R8 in the by-pass circuit.

The field bridge circuit in Fig. 3A is provided with a capacitor C as hereinbefore described in connection with Fig. 1A.

I claim:

1. In combination, a translating device having a pair of inductive regulating windings, a pair of resistors connected in a bridge network with said windings and disposed in alternate branches thereof, a pair of unidirectional conducting devices each having input terminals and output terminals, one of said unidirectional conducting devices having its output terminals connected across one pair of diagonally opposite junctions of said bridge network and the other unidirectional conducting device having its output terminals connected across the other pair of diagonally opposite junctions of said bridge network, an alternating current supply source, means for selectively connecting said source to the input terminals of said unidirectional conducting devices for energizing said inductive regulating windings in opposite directions, connection of said source to the input terminals of one of said unidirectional conducting devices effecting energization of said inductive regulating windings in one direction and also causing current flow through said resistors and said other unidirectional conducting device in a by-pass circuit which current by-passes said inductive regulating windings, and means responsive to connection of said source to one of said unidirectional conducting devices for decreasing the current by-passing said inductive regulating windings through said other unidirectional conducting device.

2. The invention defined in claim 1, wherein the last mentioned means comprises a capacitor connected between mid-portions of said pair of resistors in said bridge network.

3. The invention defined in claim 1, wherein the last mentioned means comprises impedance means having a high value relative to the impedance of said windings and means responsive to connection of said source to one of said unidirectional conducting devices for effectively inserting said impedance means in the by-pass circuit extending through said other unidirectional conducting device.

4. The invention defined in claim 3, wherein said impedance means comprises a resistor having a high ohmic value relative to the impedance of said windings in circuit with each of said unidirectional conducting devices, and said inserting means comprises normally closed contacts shunting said resistors.

5. In combination, a translating device having a pair of inductive regulating windings, a pair of resistors connected in a bridge network with said windings and disposed in alternate branches thereof, an alternating current supply source, and means for selectively connecting said source to one or the other pair of diagonally opposite junctions of said bridge network for unidirectional energization of said inductive regulating windings in opposite directions, said means comprising selectively operable contacts, and unidirectional devices between said contacts and said windings for preventing inductive discharge of said windings through said contacts.

6. The invention defined in claim 5, wherein said windings comprise field windings of an electrodynamic machine arranged for selective forward or reverse energization.

7. The invention defined in claimm 5, wherein said windings comprise shunt field windings of a direct current motor.

8. The invention defined in claim 5, wherein said windings comprise series field windings of a direct current motor.

9. In a motor control system, in combination with a motor having an armature winding and a pair of field windings, a pair of resistors connected in a bridge network with said field windings and disposed in alternate branches therof, means for energizing said armature and field windings and comprising means for energizing said field windings in selectively opposite directions for forward and reverse operation of the motor, respectively, the last mentioned energizing means comprising an alternating current source, forward and reverse switches, and a pair of unidirectional conducting devices each having input terminals and output terminals, the input terminals of a first one of said devices being connectable through said forward switches to said source and the input terminals of the other device being connectable through said reverse switches to said source, the output terminals of said first device being connected across one pair of diagonally opposite junctions of said bridge network and the output terminals of said other device being connected across the other pair of diagonally opposite junctions of said bridge network, and said bridge network having a discharge path for said field windings which by-passes said forward and reverse switches.

10. The invention defined in claim 9, wherein said means for energizing said armature and field windings further comprises an amplifier for supplying and controlling power from said source through selected ones of said switches and unidirectional conducting devices in series to said armature and pair of field windings.

11. The invention defined in claim 10, together with means for adjusting the output of said amplifier to control the speed of the motor.

12. The invention defined in claim 9, together with braking means for said motor.

13. The invention defined in claim 12, wherein said braking means comprises regenerative braking means, and means responsive to decrease of the motor load current to a predetermined value for rendering said regenerative braking means effective.

14. The invention defined in claim 12, wherein said braking means comprises eddy current braking means coupled to said motor, and means responsive to change in the value of motor load current for rendering said eddy current braking means effective as a function thereof.

15. The invention defined in claim 9, wherein said means for energizing said armature and field windings comprises an alternating current source, an amplifier connected between said source and said armature, first adjustable means for adjusting the output of said amplifier to selectively control the armature voltage, forward and reverse switches, a field strengthening network for connecting said source through some of said forward switches to said input terminals of said first unidirectional conducting device and through some of said reverse switches to said input terminals of said other unidirectional conducting device, a field weakening network for connecting said source through others of said forward switches to said input terminals of said other unidirectional conducting device and through others of said reverse switches to said input terminals of said first unidirectional conducting device, said field windings being energizable through said field strengthening network and selectively through said forward and reverse switches in shunt of the armature winding, and second adjustable means for adjusting the output of said field weakening network for controlling the speed of the motor.

16. The invention defined in claim 15, wherein said first and second adjustable means are mechanically interconnected to prevent field weakening under the control of said second adjustable means until said first adjustable means has been operated to apply full armature voltage.

17. The invention defined in claim 16, together with means for initiating stopping of the motor, and means responsive to said stopping means for rendering said field weakening network ineffective.

18. The invention defined in claim 9, wherein said means for energizing said field windings comprises an alternating current source, forward and reverse switches, a field strengthening network comprising an amplifier for connecting said source through certain ones of said forward switches to said input terminals of said first unidirectional conducting device and through certain ones of said reverse switches to said other unidirectional conducting device, and a field weakening network comprising an amplifier for connecting said source through others of said forward switches to said input terminals of said other unidirectional conducting device and through others of said reverse switches to said input terminals of said first unidirectional conducting device to oppose the respective forward and reverse energizations of said field windings supplied through said field strengthening network.

19. The invention defined in claim 18, wherein said field weakening network further comprises means for selectively adjusting the output thereof to adjust the motor speed.

20. The invention defined in claim 19, wherein said field weakening network further comprises amplifier means for automatically limiting the armature current below a predetermined value when said adjusting means is operated to accelerate the motor, and said field strengthening network further comprises amplifier means for automatically limiting the armature current below a predetermined value when said switches are operated to reverse the energization of the field windings.

21. The invention defined in claim 20, together with braking means for said motor, means responsive to the motor load current decreasing to a predetermined adjustable value for rendering said braking means effective, and means responsive to the motor load current again increasing to a predetermined value for rendering said braking means ineffective.

References Cited in the file of this patent

UNITED STATES PATENTS

| | | |
|---|---|---|
| 2,482,101 | Cooper | Sept. 20, 1949 |
| 2,555,992 | Ogle | June 5, 1951 |
| 2,569,317 | Jones | Sept. 25, 1951 |